US008709692B2

(12) United States Patent
Miyata et al.

(10) Patent No.: US 8,709,692 B2
(45) Date of Patent: *Apr. 29, 2014

(54) POLYESTER RESIN FOR TONER, ELECTROSTATIC CHARGE IMAGE DEVELOPING TONER, ELECTROSTATIC CHARGE IMAGE DEVELOPER, TONER CARTRIDGE, PROCESS CARTRIDGE, IMAGE FORMING APPARATUS, AND IMAGE FORMING METHOD

(75) Inventors: Emi Miyata, Kanagawa (JP); Sumiaki Yamasaki, Kanagawa (JP); Yuki Sasaki, Kanagawa (JP); Satoshi Hiraoka, Kanagawa (JP); Hirofumi Shiozaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/604,088

(22) Filed: Sep. 5, 2012

(65) Prior Publication Data
US 2013/0244170 A1    Sep. 19, 2013

(30) Foreign Application Priority Data
Mar. 19, 2012    (JP) .................................. 2012-062804

(51) Int. Cl.
G03G 9/087    (2006.01)

(52) U.S. Cl.
USPC ..................... 430/109.4; 430/123.5; 528/176; 399/252

(58) Field of Classification Search
USPC .............. 430/109.4, 123.5; 528/176; 399/252
See application file for complete search history.

(56) References Cited

FOREIGN PATENT DOCUMENTS

| JP | A-2006-292820 | 10/2006 | |
| JP | A-2007-248704 | 9/2007 | |
| JP | A-2011-164338 | 8/2011 | |
| JP | 2011-246647 | * 12/2011 | ............. C08G 59/14 |

OTHER PUBLICATIONS

Translation of JP 2011-246647 (patent No. 4699558) published Dec. 2011.*

* cited by examiner

Primary Examiner — Peter Vajda
(74) Attorney, Agent, or Firm — Oliff PLC

(57) ABSTRACT

A polyester resin for a toner is a polycondensate of a carboxylic acid component and an alcohol component including rosin diol that is represented by the following formula (1) and has an alicyclic structure (alicyclic alcohol),

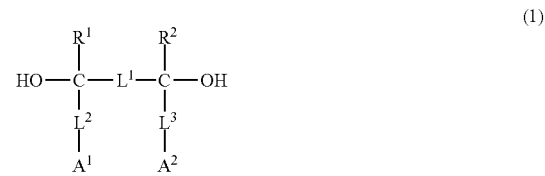

(1)

wherein $R^1$ and $R^2$ each independently represents hydrogen or a methyl group, $L^1$ represents a divalent linking group having an alicyclic structure, $L^2$ and $L^3$ each independently represents a divalent linking group selected from a group consisting of a carbonyl group, a carboxyl group, an ether group, a sulfonyl group, a chain-like alkylene group which may have a substituent, a cyclic alkylene group, a phenylene group, and combinations thereof, and $A^1$ and $A^2$ represent a rosin ester group, provided that a divalent linking group having the alicyclic structure represented by $L^1$ may be a divalent linking group having an alicyclic structure formed through linking with any of $R^1$, $R^2$, $L^2$ or $L^3$.

22 Claims, 2 Drawing Sheets

POLYESTER RESIN FOR TONER, ELECTROSTATIC CHARGE IMAGE DEVELOPING TONER, ELECTROSTATIC CHARGE IMAGE DEVELOPER, TONER CARTRIDGE, PROCESS CARTRIDGE, IMAGE FORMING APPARATUS, AND IMAGE FORMING METHOD

CROSS-REFERENCE TO RELATED APPLICATIONS

This application is based on and claims priority under 35 USC 119 from Japanese Patent Application No. 2012-062804 filed Mar. 19, 2012.

BACKGROUND

Technical Field

The present invention relates to a polyester resin for a toner, an electrostatic charge image developing toner, an electrostatic charge image developer, a toner cartridge, a process cartridge, an image forming apparatus, and an image forming method.

SUMMARY

According to an aspect of the invention, there is provided a polyester resin for a toner which is a polycondensate of a carboxylic acid component and an alcohol component including rosin diol that is represented by the following formula (1) and has an alicyclic structure (alicyclic alcohol),

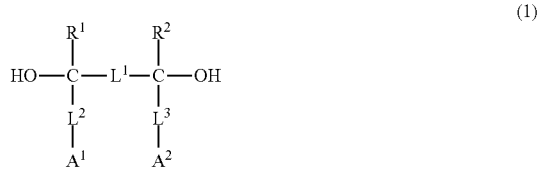

(1)

In the formula (1), and $R^2$ each independently represents hydrogen or a methyl group, $L^1$ represents a divalent linking group having an alicyclic structure, $L^2$ and $L^3$ each independently represents a divalent linking group selected from a group consisting of a carbonyl group, a carboxyl group, an ether group, a sulfonyl group, a chain-like alkylene group which may have a substituent, a cyclic alkylene group, a phenylene group, and combinations thereof, and $A^1$ and $A^2$ represent a rosin ester group, provided that the divalent linking group having the alicyclic structure represented by $L^1$ may be a divalent linking group having an alicyclic structure formed through linking with any of $R^1$, $R^2$, $L^2$ or $L^3$.

BRIEF DESCRIPTION OF THE DRAWINGS

Exemplary embodiments of the present invention will be described in detail based on the following figures, wherein.

DETAILED DESCRIPTION

Figure 1:
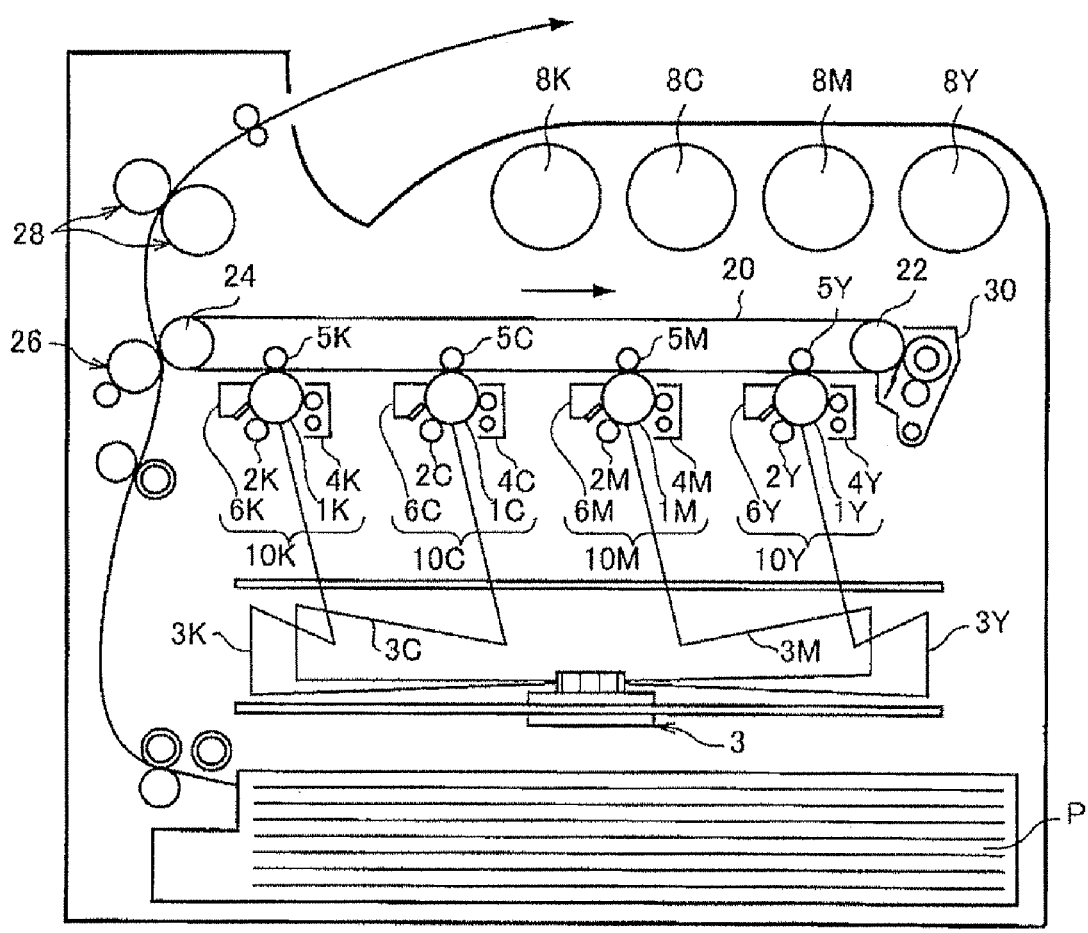
FIG. 1 is a schematic configuration view showing an example of an image forming apparatus according to an exemplary embodiment.

Hereinafter, an exemplary embodiment which is an example of the invention will be described in detail.

Polyester Resin for a Toner

A polyester resin for a toner according to the exemplary embodiment firstly includes a polyester resin for a toner which is a polycondensate of a carboxylic acid component and an alcohol component including a rosin diol that is represented by the following formula (1) and has an alicyclic structure (hereinafter sometimes referred to as the specific rosin diol A) as a first exemplary embodiment.

In addition, the polyester resin for a toner according to the exemplary embodiment includes a polyester resin for a toner which is a polycondensate of a carboxylic acid component and an alcohol component including a rosin diol that is represented by the following formula (2) (hereinafter sometimes referred to as the specific rosin diol B) and has an alicyclic structure as a second exemplary embodiment.

Here, a polyester resin polycondensated using rosin diol as the alcohol component is considered to have a tendency of improving toner characteristics termed blocking resistance and charging properties.

However, for the polyester resin polycondensated using rosin diol as a polycondensation component, there is a tendency of the difference between the glass transition temperature and the softening point increasing, and, in a case in which the polyester resin is used for a toner, the softening point influences low-temperature fixing properties, and the glass transition temperature influences heat storage properties, and therefore it is considered that there are cases in which it is difficult to satisfy both low-temperature fixing properties and heat storage properties.

Therefore, when the polyester resin for a toner according to the exemplary embodiment employs any form of the first and second exemplary embodiments, the difference between the glass transition temperature and the softening point is reduced in the polyester resin for a toner.

The reason for the above is not evident, but is considered as follows.

For both cases of the first and second exemplary embodiments, the polyester resin for a toner according to the exemplary embodiment uses an alcohol having an alicyclic structure as the alcohol component which is a component for polycondensation.

Here, in the exemplary embodiment, the "alicyclic structure" indicates an alicyclic structure present between the carboxylic acid component and a hydroxyl group to be polycondensated (hereinafter referred to as the polycondensation portion).

That is, the polyester resin for a toner according to the exemplary embodiment forms a polyester resin for a toner for which rosin diol is used as a polycondensation component and which has an alicyclic structure in the major chain for both cases in which the alcohol components of the first and second exemplary embodiments are used.

As a result, the polyester resin for a toner according to the exemplary embodiment has a rigid molecular structure, and entanglement between the molecular chains near the softening point is suppressed, and therefore the softening point is considered to decrease.

From the above, it is considered that the difference between the softening point and the glass transition temperature is reduced in the polyester resin for a toner according to the exemplary embodiment.

In addition, since a toner according to the exemplary embodiment includes a polyester resin for a toner for which the difference between the softening point and the glass transition temperature is reduced, it is considered that both low-temperature fixing properties and heat storage properties may be satisfied.

Hereinafter, the polyester resin for a toner according to the exemplary embodiment will be described in detail.

Alcohol Component

The polyester resin for a toner according to the exemplary embodiment firstly includes a polyester resin for a toner which is a polycondensate of a carboxylic acid component and an alcohol component including the specific rosin diol A as the first exemplary embodiment.

That is, the alcohol component in the first exemplary embodiment is specifically considered to have a form of the following (I-1) or (I-2).

(I-1) An alcohol component including i) the specific rosin diol A, but not including an alcohol having an alicyclic structure.

(I-2) An alcohol component for which i) the specific rosin diol A and ii) an alcohol having an alicyclic structure except the specific rosin diol A are jointly used.

Next, the polyester resin for a toner according to the exemplary embodiment includes a polyester resin for a toner which is a polycondensate of a carboxylic acid component and an alcohol component including the specific rosin diol B and an alcohol having an alicyclic structure as the second exemplary embodiment.

That is, the alcohol component in the second exemplary embodiment is considered to have a form of the following (II-1).

(II-1) An alcohol component for which iii) the specific rosin diol B and iv) an alcohol having an alicyclic structure are jointly used In the exemplary embodiment, in addition to the above i) to iv), other alcohols not having an alicyclic structure may be jointly used.

The content of the above i) to iv) varies by the forms of the above (I) and (II).

Specifically, in (I-1), the content of i) the specific rosin diol A is preferably from 70% by weight to 100% by weight, more preferably from 80% by weight to 100% by weight, and still more preferably 90% by weight to 100% by weight, with respect to the entire alcohol component.

In (I-2), the total content of i) the specific rosin diol A and ii) the alcohol having an alicyclic structure except the specific rosin diol A is, similarly to the content of i) the specific rosin diol A in the above (I), preferably from 70% by weight to 100% by weight, more preferably from 80% by weight to 100% by weight, and still more preferably from 90% by weight to 100% by weight, with respect to the entire alcohol component.

In addition, the content of ii) the alcohol having an alicyclic structure except the specific rosin diol A is preferably 90% by weight or less, more preferably 80% by weight or less, and still more preferably 70% by weight or less, with respect to the entire alcohol component.

In (II-1), the content of iv) the alcohol having an alicyclic structure is preferably from 10% by weight to 30% by weight with respect to the entire alcohol component.

In addition, the content of iii) the specific rosin diol B is preferably from 70% by weight to 90% by weight with respect to the entire alcohol component.

Hereinafter, the i) to iv) alcohols will be described in detail.

i) Specific Rosin Diol A

The specific rosin diol A is a dialcohol compound having an alicyclic structure and two rosin ester groups in a molecule.

Meanwhile, in the exemplary embodiment, the rosin ester group refers to a residue obtained by removing a hydrogen atom from a carboxyl group included in rosin.

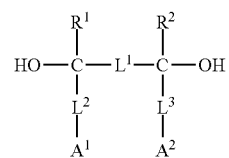

(1)

In the formula (1), $R^1$ and $R^2$ each independently represents hydrogen or a methyl group. $L^1$ represents a divalent linking group having an alicyclic structure. $L^2$ and $L^3$ each independently represents a divalent linking group selected from a group consisting of a carbonyl group, a carboxyl group, an ether group, a sulfonyl group, a chain-like alkylene group which may have a substituent, a cyclic alkylene group, a phenylene group, and combinations thereof. $A^1$ and $A^2$ represent a rosin ester group. However, the divalent linking group having the alicyclic structure represented by $L^1$ may be a divalent linking group having an alicyclic structure formed through linking with any of $R^1$, $R^2$, $L^2$ or $L^3$.

The divalent linking group having an alicyclic structure which is represented by $L^1$ includes cyclic alkylene groups which may have a substituent.

In addition, the divalent linking group having an alicyclic structure which is represented by $L^1$ may be a linking group obtained by combining a cyclic alkylene group which may have a substituent and a group selected from a group consisting of a carbonyl group, a carboxyl group, an ether group, a sulfonyl group, a chain-like alkylene group which may have a substituent, and combinations thereof.

Examples of the chain-like alkylene group of $L^1$ include alkylene groups having from 1 to 10 carbon atoms.

The cyclic alkylene group of $L^1$ preferably has from 3 to 7 carbon atoms, and is more preferably a six-membered ring having 6 carbon atoms.

That is, the alicyclic structure is preferably a six-membered ring structure.

Since the alicyclic structure is a six-membered ring structure, and the molecular structure of the polyester resin for a toner becomes rigid in a case in which the specific rosin diol A is used as a polycondensation component, it is considered that entanglement between molecular chains near the softening point is suppressed, and the glass transition temperature decreases.

Thereby, the difference between the glass transition temperature and the softening point is reduced in the polyester resin for a toner.

The six-membered structure is preferably a structure in which a six-membered ring is linked at a symmetric location, that is, the six-membered ring is linked at locations of the first position and the forth position (the location of the para-position in an aromatic ring).

That is, the six-membered structure in $L^1$ is, specifically, preferably linked as follows.

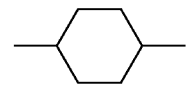

Since $L^1$ is a divalent linking group having the six-membered structure so that deformation is suppressed, and the specific rosin diol A has a substantially planar structure, in a case in which the specific rosin diol A is used as a polycondensation component, it becomes easy to obtain a rigid polyester resin for a toner for which the structure is stabilized.

Thereby, the difference between the glass transition temperature and the softening point is reduced in the polyester resin for a toner.

In the divalent linking group having an alicyclic structure which is represented by $L^1$, the number of cyclic alkylene groups is preferably 1 to 3, and more preferably 1 to 2.

Here, in the divalent linking group having an alicyclic structure, the alicyclic structure may be a structure formed through linking of some of groups represented by $L^1$ and any of $R^1$, $R^2$, $L^2$, and $L^3$.

Examples of the chain-like alkylene group in $L^2$ and $L^3$ include alkylene groups having from 1 to 10 carbon atoms.

Examples of the cyclic alkylene group in $L^2$ and $L^3$ include cyclic alkylene groups having from 3 to 7 carbon atoms.

Examples of the substituent in the chain-like alkylene group and the cyclic alkylene group in $L^1$ to $L^3$ include alkyl groups, aryl group, and the like having from 1 to 8 carbon atoms, and linear, branched, or cyclic alkyl groups are preferable. Specific examples include a methyl group, an ethyl group, a propyl group, a butyl group, a pentyl group, a hexyl group, a heptyl group, an octyl group, an isopropyl group, an isobutyl group, an s-butyl group, a t-butyl group, an isopentyl group, a neopentyl group, a 1-methylbutyl group, an isohexyl group, a 2-methylhexyl group, a 2-ethylhexyl group, a cyclopentyl group, a cyclohexyl group, a phenyl group, and the like.

The following formulae (3) and (4) are specifically shown as preferable examples of the specific rosin diol A, but the exemplary embodiment is not limited thereto.

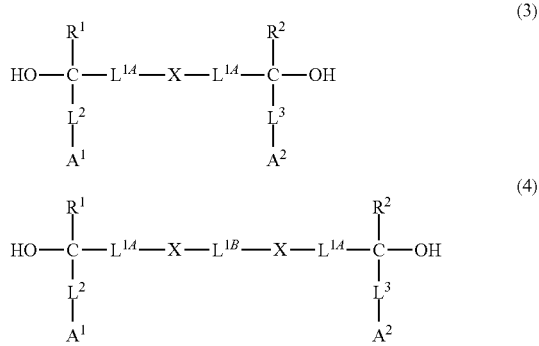

In the formulae (3) and (4), $R^1$, $R^2$, $L^2$, $L^3$, $A^1$, and $A^2$ are the same as $R^1$, $R^2$, $L^2$, $L^3$, $A^1$, and $A^2$ in the formula (1).

X represents a cyclic alkylene group which may have a substituent.

Linking groups of $L^{1A}$ and $L^{1B}$ include a carbonyl group, a carboxyl group, an ether group, a sulfonyl group, combined groups thereof, and chain-like alkylene groups which may have a substituent.

$L^{1A}$ is preferably an oxyalkylene group, and $L^{1B}$ is preferably an alkylene group.

ii) Alcohol having an alicyclic structure except the specific rosin diol A

The alcohol having an alicyclic structure except the specific rosin diol A may or may not have a rosin ester group.

Examples of the alcohol having an alicyclic structure except the specific rosin diol A which has no rosin ester group include hydrogenated bisphenol A, cyclopropane-1, 2-dimethanol, 1,3-cyclopentanediol, 1,3-cyclohexanedimethanol, 1,4-cyclohexanedimethanol, dianhydrohexitol.

iii) Specific Rosin Diol B

The specific rosin diol B is a dialcohol compound having no alicyclic structure and having two rosin ester groups in a molecule.

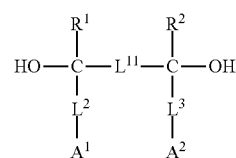

In the formula (2), $R^1$ and $R^2$ each independently represents hydrogen or a methyl group. $L^{11}$ represents a divalent linking group selected from a group consisting of a carbonyl group, a carboxyl group, an ether group, a sulfonyl group, a chain-like alkylene group which may have a substituent, a phenylene group, and combinations thereof. $L^2$ and $L^3$ each independently represents a divalent linking group selected from a group consisting of a carbonyl group, a carboxyl group, an ether group, a sulfonyl group, a chain-like alkylene group which may have a substituent, a cyclic alkylene group, a phenylene group, and combinations thereof. $A^1$ and $A^2$ represent a rosin ester group.

$R^1$, $R^2$, and $A^2$ are the same as $R^1$, $R^2$, $L^2$, $L^3$, $A^1$, and $A^2$ in the formula (1).

Examples of the chain-like alkylene group in $L^{11}$ include, similarly to $L^2$ and $L^3$ in the formula (1), alkylene groups having from 1 to 10 carbon atoms.

In addition, examples of the substituent in the chain-like alkylene group are the same as for $L^2$ and $L^3$ in the formula (1).

iv) Alcohol Having an Alicyclic Structure

It is sufficient that the alcohol having an alicyclic structure has an alicyclic structure.

Examples of the alcohol having an alicyclic structure include hydrogenated bisphenol A, cyclopropane-1,2-dimethanol, 1,3-cyclopentanediol, 1,3-cyclohexanedimethanol, 1,4-cyclohexanedimethanol, and dianhydrohexitol.

Other Alcohols not Having an Alicyclic Structure

The alcohols not having an alicyclic structure include alipathic diols and aromatic diols which do not have an alicyclic structure.

Specific examples of the aliphatic diol include ethylene glycol, 1,2-propanediol, 1,3-propanediol, 1,2-butanediol, 1,3-butanediol, 1,4-butanediol, 2,3-butanediol, 1,4-butendiol, 2-methyl-1,3-propandiol, 1,5-pentanediol, neopentyl glycol, 2-ethyl-2-methylpropane-1,3-diol, 2-butyl-2-ethylpropane-1,3-diol, 1,6-hexanediol, 3-methyl-1,5-pentanediol, 2-ethyl-1,3-hexanediol, 2,4-dimethyl-1,5-pentanediol, 2,2,4-trimethyl-1,3-pentanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, 1,14-eicosanedecanediol, dimer diol, 3-hydroxy-2,2-dimethylpropyl-3-hydroxy-2,2-dimethylpropanoate, diethylene glycol, triethylene glycol, polyethylene glycol, dipropylene glycol, polypropylene glycol, and the like, but the aliphatic diol is not limited thereto.

The aromatic diol includes bisphenol A ethylene oxide adducts, bisphenol A propylene oxide adducts, bisphenol A butylene oxide adducts, and the like, but is not limited thereto.

Synthesis Method of Rosin Diol

A synthesis method of overall rosin diol will be described.

Rosin diol may be synthesized using a well-known method, and is synthesized through, for example, a reaction between a bifunctional epoxy compound and rosin.

Hereinafter, a synthesis scheme of rosin diol will be shown as an example.

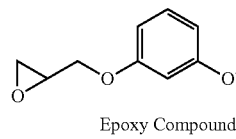
Epoxy Compound

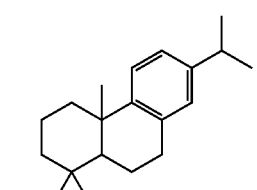
Rosin

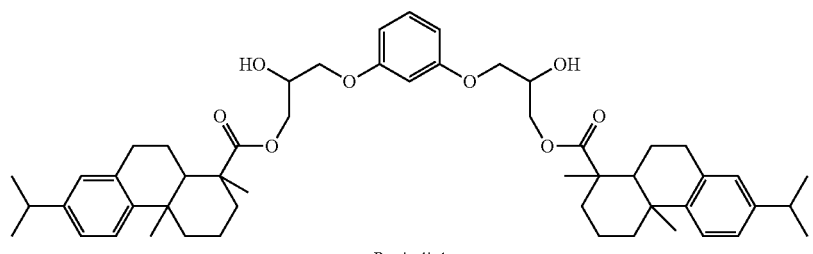
Rosindiol

The bifunctional epoxy compound includes two epoxy groups in a molecule, and examples thereof include diglycidyl ethers of aromatic-based diols, diglycidyl ethers of aromatic-based dicarboxylic acids, diglycidyl ethers of aliphatic diols, diglycidyl ethers of alicyclic diols, alicyclic epoxides, and the like.

Representative examples of the diglycidyl ethers of aromatic-based diols include, as an aromatic diol component, bisphenol. A; derivatives of bisphenol A such as polyalkylene oxide adducts of bisphenol A; bisphenol F; derivatives of bisphenol F such as polyalkylene oxide adducts of bisphenol F; bisphenol S; derivatives of bisphenol S such as polyalkylene oxide adducts of bisphenol S; resorcinol; t-butylcatechol; biphenol; and the like.

Representative examples of the diglycidyl ethers of aromatic-based dicarboxylic acid include, as an aromatic dicarboxylic acid component, terephthalic acid, isophthalic acid, phthalic acid, and the like.

Representative examples of the diglycidyl ethers of aliphatic-based diols include, as an aliphatic diol component, ethylene glycol, 1,2-propanediol, 1,3-propanediol, 1,4-butanediol, 1,5-pentanediol, 1,6-hexanediol, neopentyl glycol, 1,9-nonanediol, diethylene glycol, triethylene glycol, polyethylene glycol, polypropylene glycol, polytetramethylene glycol, and the like.

The representative examples of the diglycidyl ethers of alicyclic diols include, as an alicyclic diol component, hydrogenated bisphenol A and derivatives of hydrogenated bisphenol A, such as polyalkylene oxide adducts of hydrogenated bisphenol A, cyclohexanedimethanol, and the like.

The representative examples of the alicyclic epoxides include limonene dioxide.

The epoxy group-containing compound is obtained through, for example, a reaction between a diol component and epihalohydrin, but may be polycondensated depending on the quantitative ratio thereof so as to increase the molecular weight.

The reaction between rosin and a bifunctional epoxy compound proceeds mainly due to a ring-opening reaction between a carboxyl group in the rosin and an epoxy group in the bifunctional epoxy compound. At this time, the reaction temperature is preferably equal to or higher than the melting temperature of both components or a temperature at which uniform mixing is possible, and, specifically, is generally in a range of 60° C. to 200° C. During the reaction, a catalyst that accelerates the ring-opening reaction of the epoxy group may be added.

The catalyst includes amines, such as ethylenediamine, trimethylamine, and 2-methylimidazole; quaternary ammonium salts, such as triethylammonium bromide, triethylammonium chloride, and butyltrimethylammonium chloride; triphenyl phosphine, and the like.

The reaction may be carried out using a variety of methods, and, for example, generally, in the case of a batch type, rosin and the bifunctional epoxy compound are put in a heatable flask having a cooling tube, a stirring apparatus, an inert gas inlet, a thermometer, and the like, heated, and melted, and the progress of the reaction is tracked through sampling of reaction products. The degree of progress of the reaction is confirmed mainly through a decrease in the acid value, and the reaction terminates at a stoichiometric reaction end point or when the progress of the reaction reaches near the stoichiometric reaction end point.

The reaction ratio between the rosin and the bifunctional compound is not particularly limited, but the molar ratio between the rosin and the bifunctional epoxy compound is preferably in the range of 1.5 mol to 2.5 mol of the rosin with respect to 1 mole of the bifunctional epoxy compound in the reaction.

Rosin used in the exemplary embodiment is a collective term of resin acids obtained from plants, and the major component is a natural product-derived substance including abietic acid which is one of tricyclic diterpenes and isomers thereof. Examples of the specific components other than abietic acid include palustric acid, neoabietic acid, pimaric acid, dehydroabietic acid, isopimaric acid, sandaracopimaric acid, and the like, and rosin used in the exemplary embodiment is a mixture thereof.

Rosin is roughly classified into three kinds of a tall rosin for which pulp is used as a raw material, a gum rosin for which turpentine is used as a raw material, and a wood rosin for which the stubble of pine is used as a raw material according to sampling methods. Rosin used in the exemplary embodiment is preferably a gum rosin and/or a tall rosin due to easy procurement.

The rosins are preferably purified. A high-molecular-weight substance which is considered to be generated from a peroxide of a resin acid or an unsaponifiable matter included in one of unpurified rosins is removed from the unpurified rosin so as to obtain a purified rosin. The purifying method is not particularly limited, and examples thereof include a variety of well-known purifying methods. Specific examples include methods, such as distillation, recrystallization, and extraction. Industrially, purification through distillation is preferable. Distillation is generally carried out at 200° C. to 300° C. at a pressure of 6.67 kPa or less for a selected distillation time. Recrystallization is carried out by, for example, dissolving unpurified rosin in a good solvent, then, distilling the solvent away so as to prepare a concentrated solution, and adding a poor solvent to the solution. Examples of the good solvent include aromatic hydrocarbons, such as benzene, toluene, and xylene; chlorinated hydrocarbons, such as chloroform; alcohols, such as a lower alcohol, ketones, such as acetone; acetic acid esters, such as ethyl acetate; and the like. Examples of the poor solvent include hydrocarbon-based solvents, such as n-hexane, n-heptane, cyclohexane, and isooctane. Extraction is a method of obtaining purified rosin by, for example, preparing an alkali aqueous solution of unpurified rosin using alkali water, extracting the insoluble unsaponifiable matter included therein using an organic solvent, and neutralizing a water layer.

The rosin may be a disproportionated rosin. The disproportionated rosin is a mixture of major components of dehydroabietic acid and dihydroabietic acid in which unstable conjugated double bonds in the molecule are lost by heating a rosin including abietic acid as a major component at a high temperature in the presence of a disproportionation catalyst.

Examples of the disproportionation catalyst include a variety of well-known catalysts, such as supported catalysts, such as palladium carbon, rhodium carbon, and platinum carbon; metal powder, such as nickel and platinum; iodine; iodized products, such as iron iodide; and the like.

In addition, the rosin may be a hydrogenated rosin for the purpose of losing the unstable conjugated double bonds in the molecule. The hydrogenation reaction may be carried out under, for example, well-known hydrogenation reaction conditions. That is, the hydrogenation reaction is carried out by heating a rosin under hydrogen pressure in the presence of a hydrogenation catalyst. Examples of the hydrogenation catalyst include a variety of well-known catalysts, such as supported catalysts, such as palladium carbon, rhodium carbon, and platinum carbon; metal powder, such as nickel and platinum; iodine; iodized products, such as iron iodide; and the like.

For the disproportionated rosin and the hydrogenated rosin, the purifying process may be provided before and after a disproportionation treatment or a hydrogenation treatment.

Hereinafter, exemplary compounds of the specific rosin diols A and B will be described.

Here, exemplary compounds (15), (16), (17), (33), (34), (35), and (42) indicate the specific rosin diol A, and other exemplary embodiments indicate the specific rosin diol B.

Meanwhile, in the exemplary compounds of the specific rosin diols, n represents an integer of 1 or more.

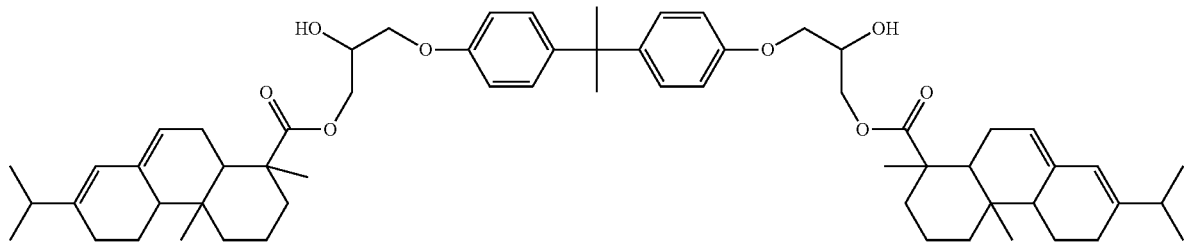

(1)

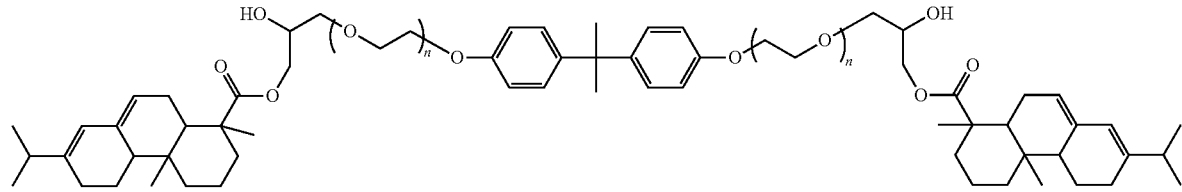

(2)

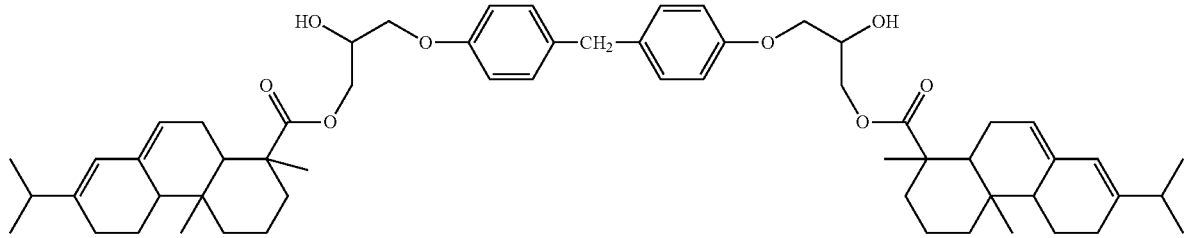

(3)

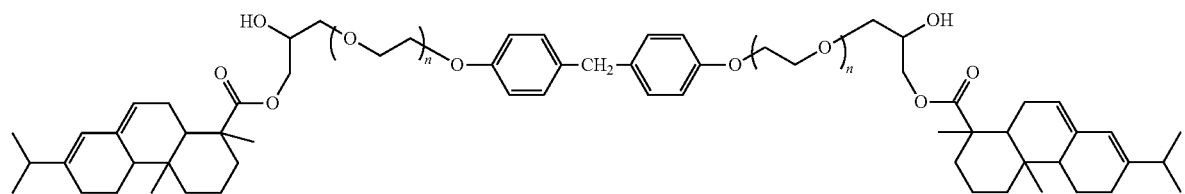
(4)
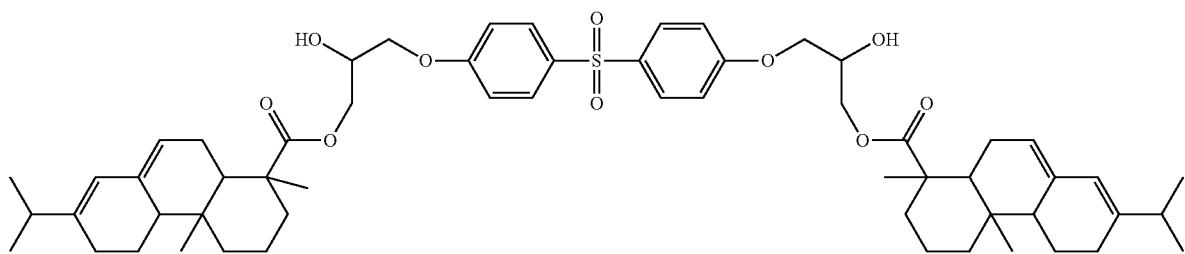
(5)
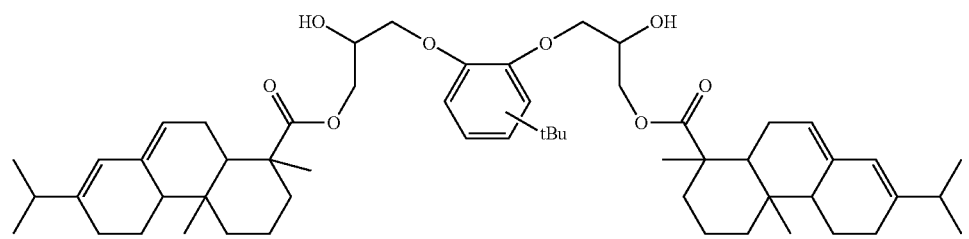
(6)
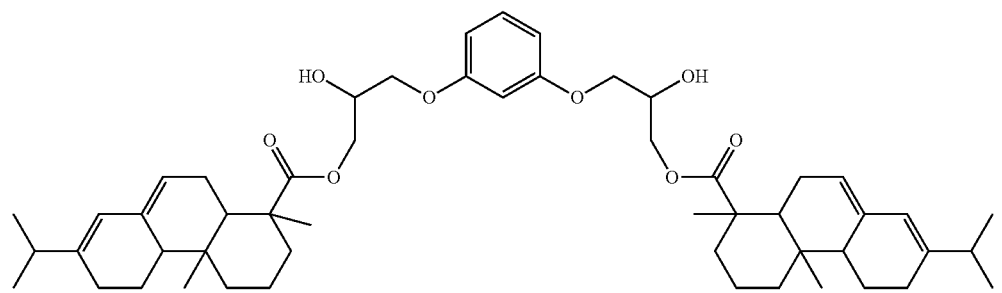
(7)
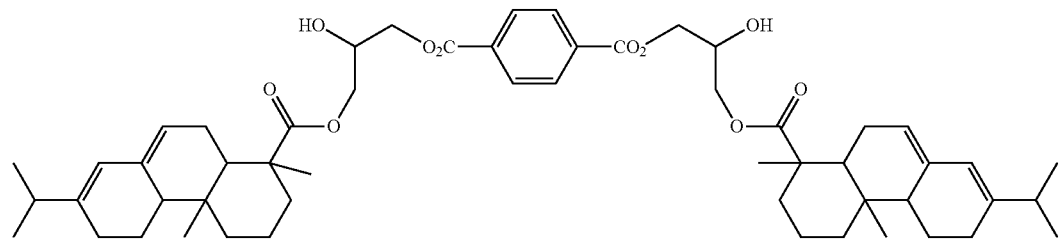
(8)
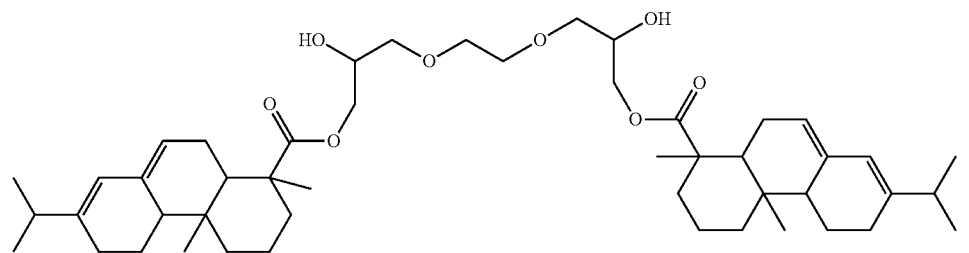
(9)

-continued
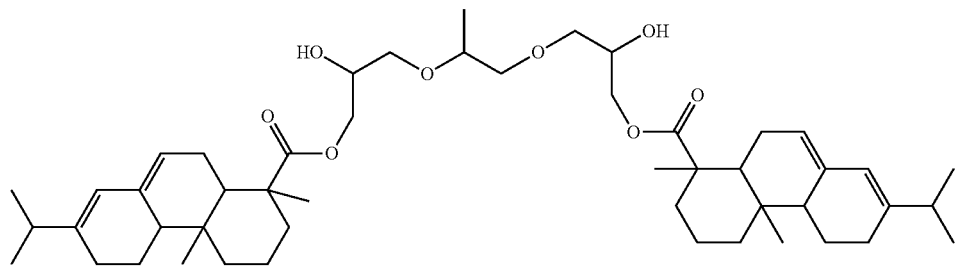
(10)
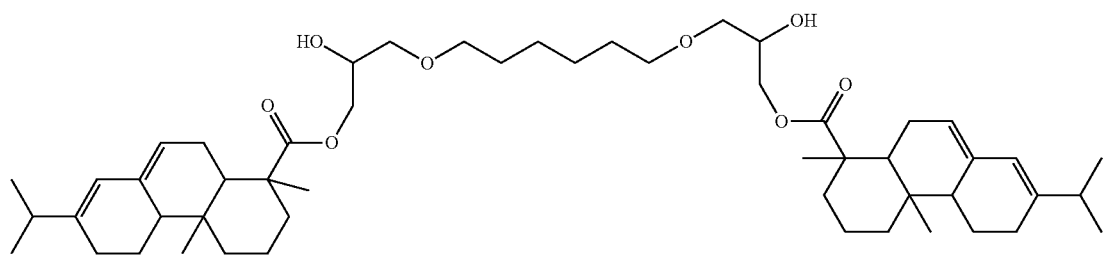
(12)
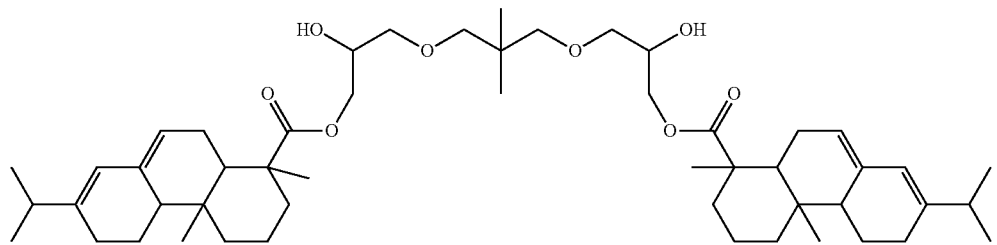
(13)
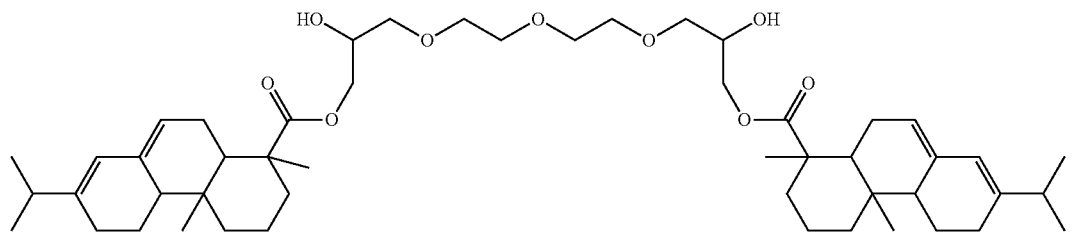
(14)
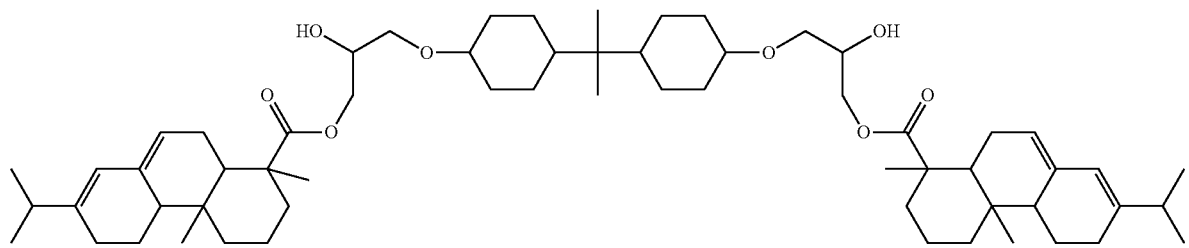
(15)
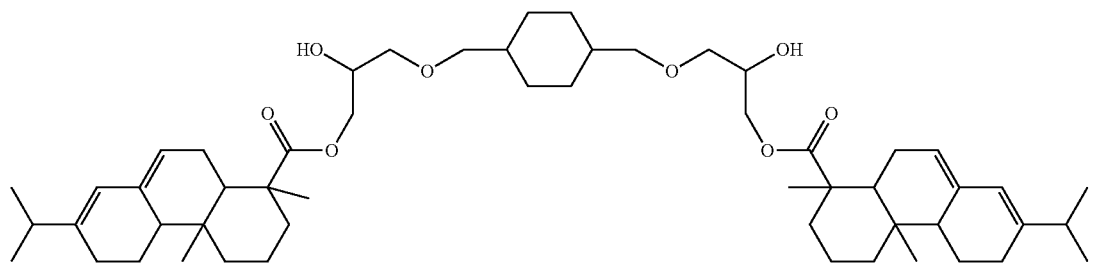
(16)

-continued
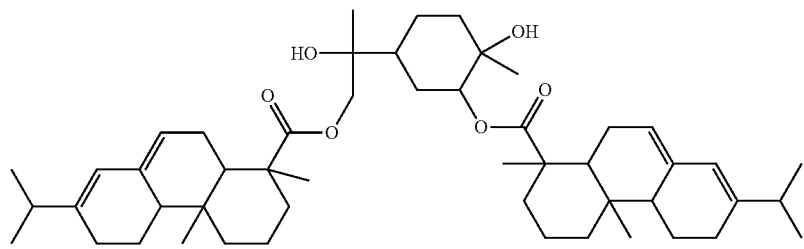
(17)
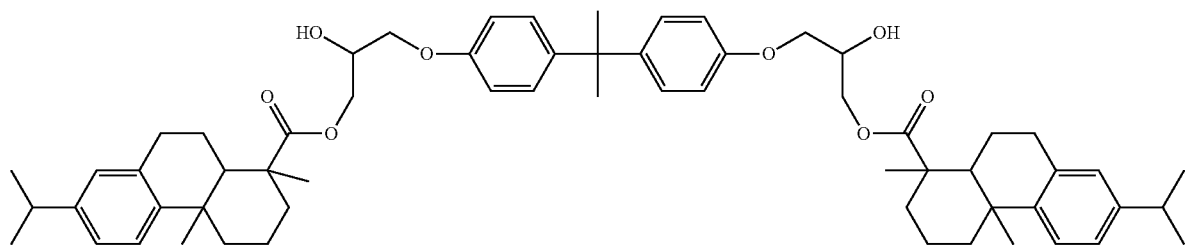
(18)
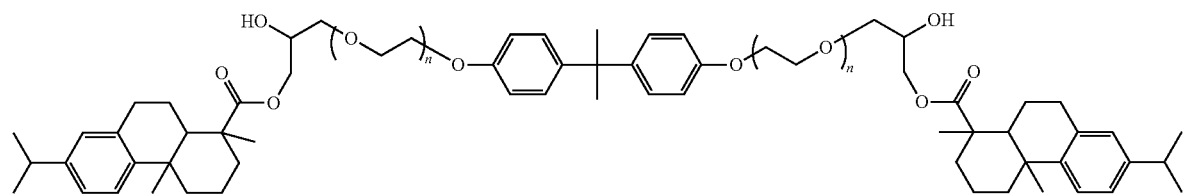
(19)
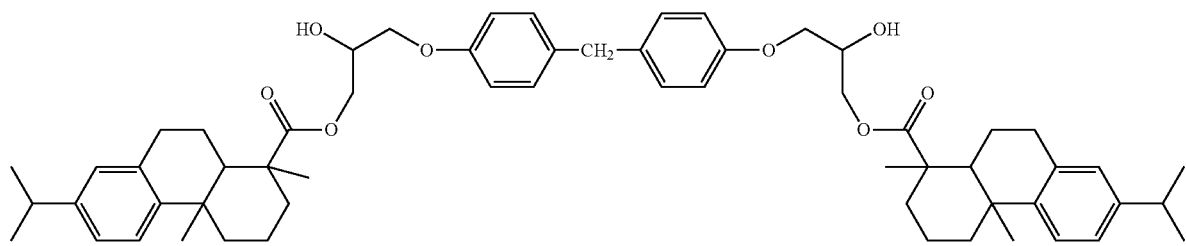
(20)
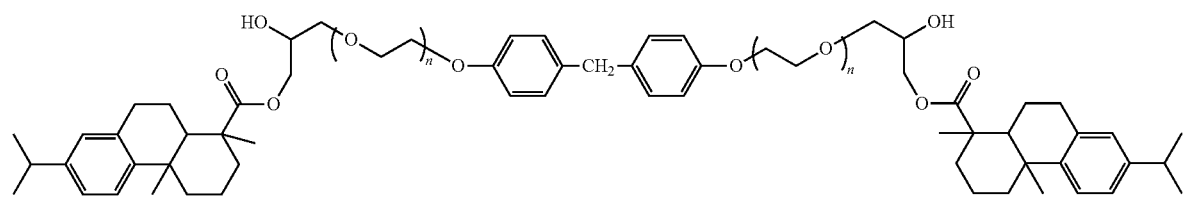
(21)
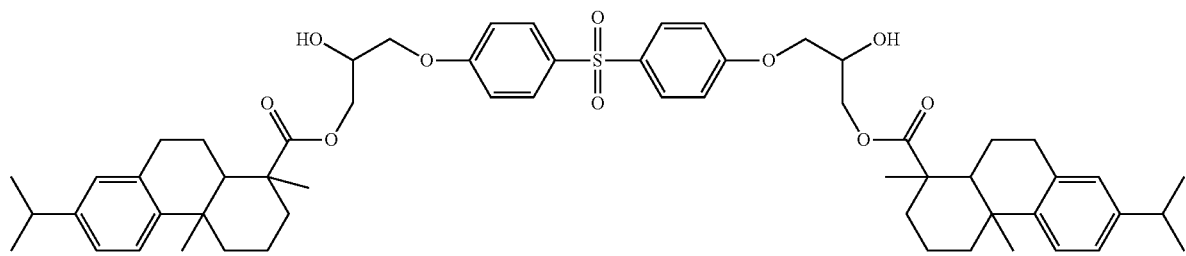
(22)

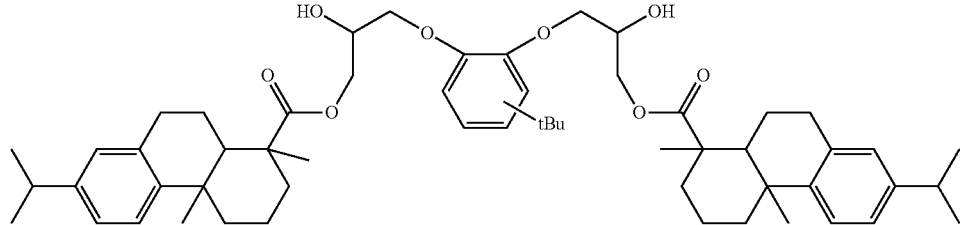
(23)
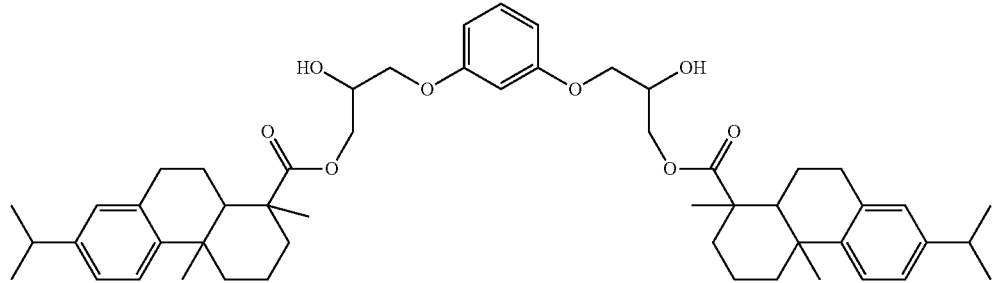
(24)
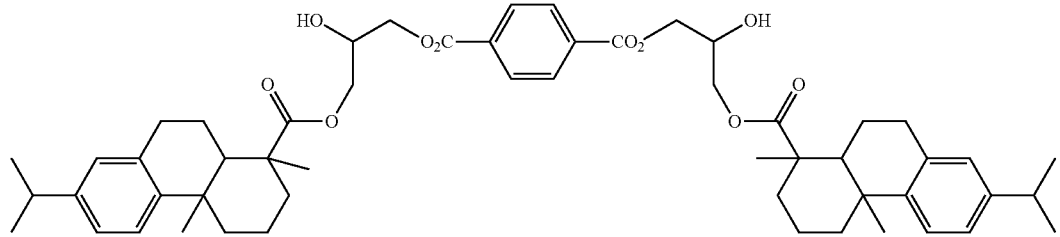
(25)
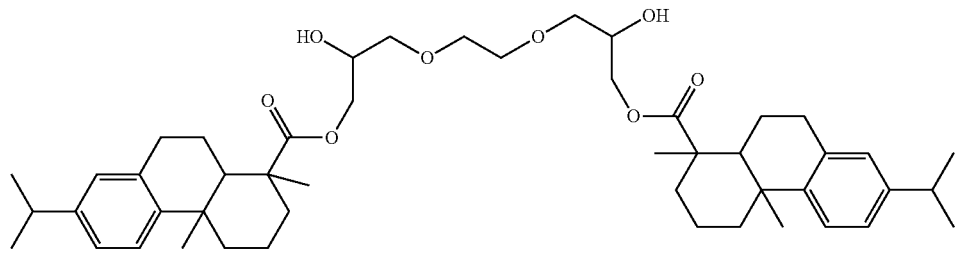
(26)
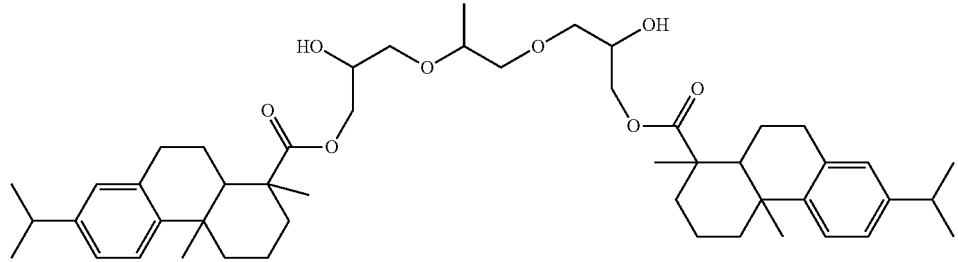
(27)
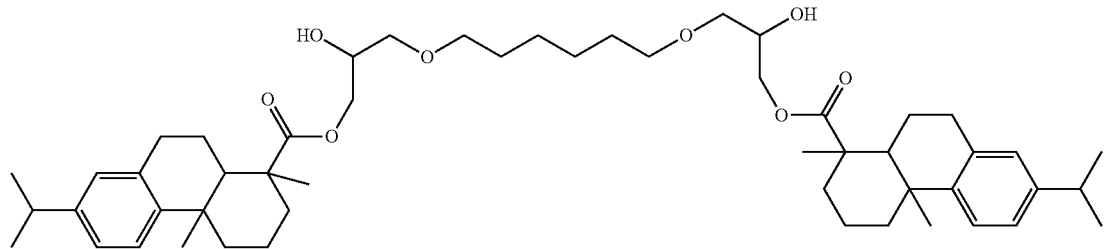
(28)

-continued
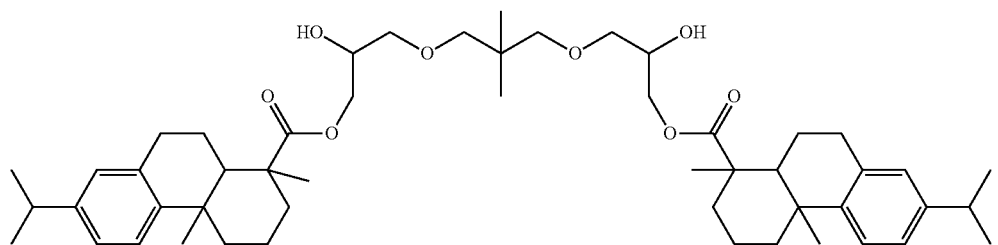
(29)
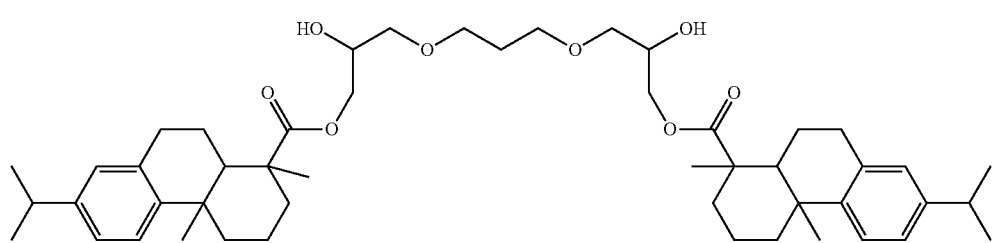
(30)
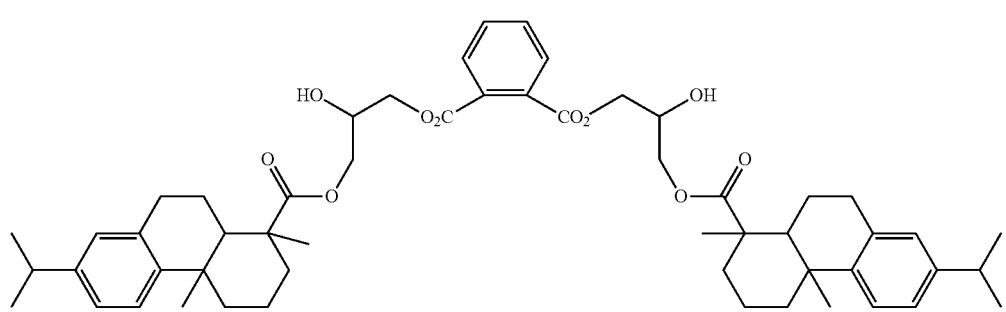
(31)
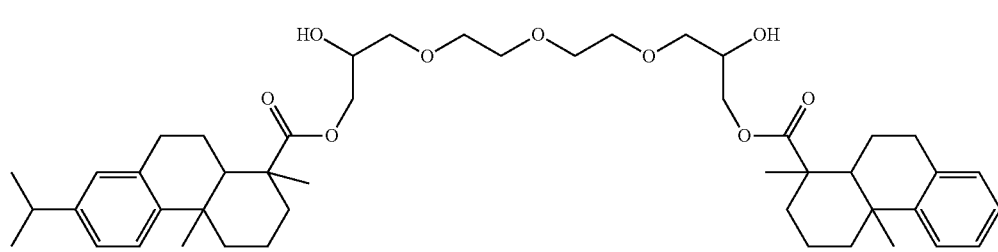
(32)
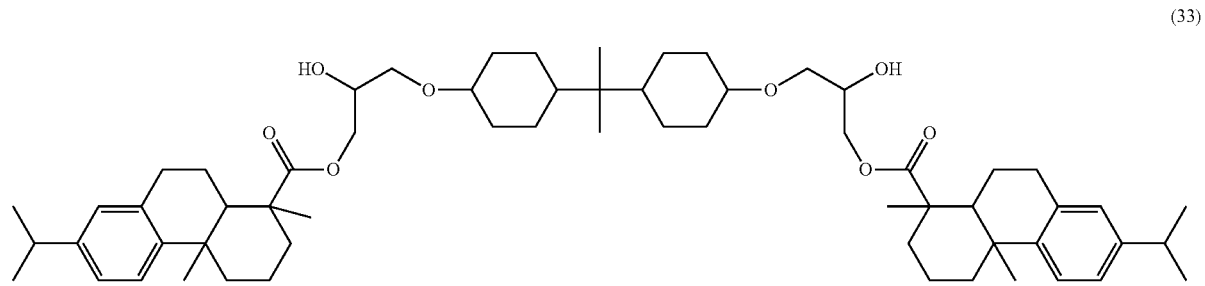
(33)
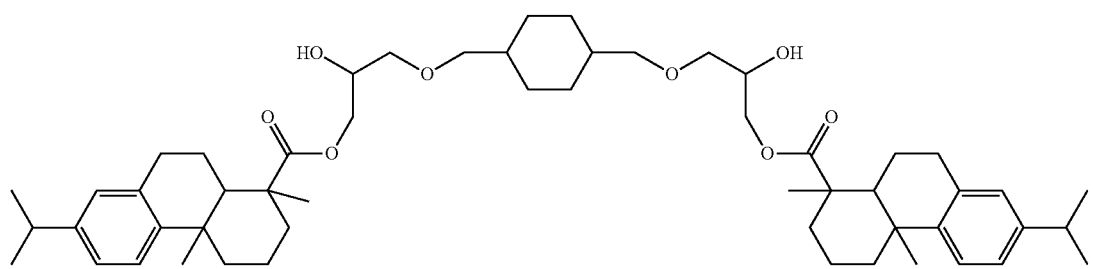
(34)

-continued
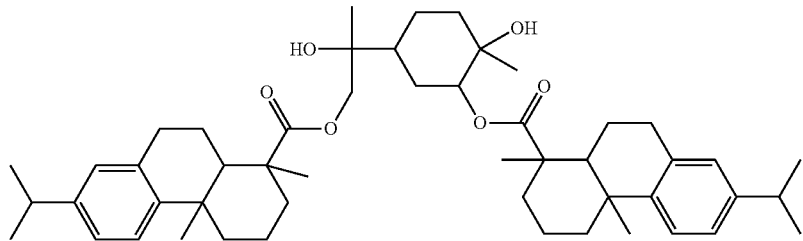
(35)
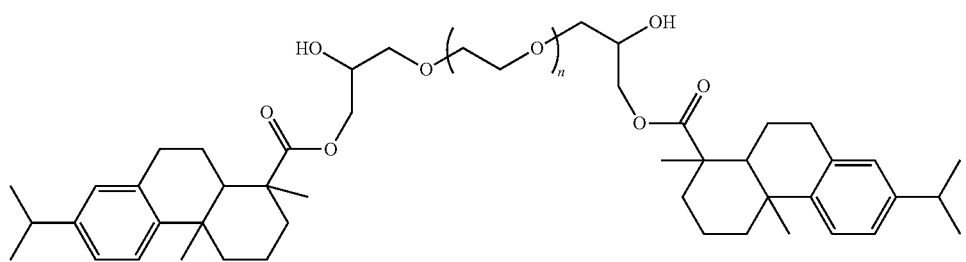
(36)
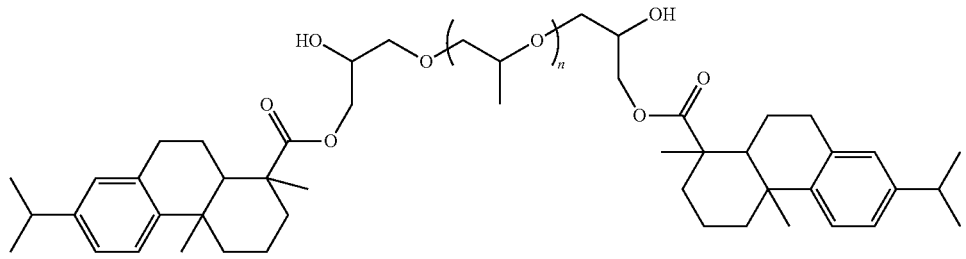
(37)
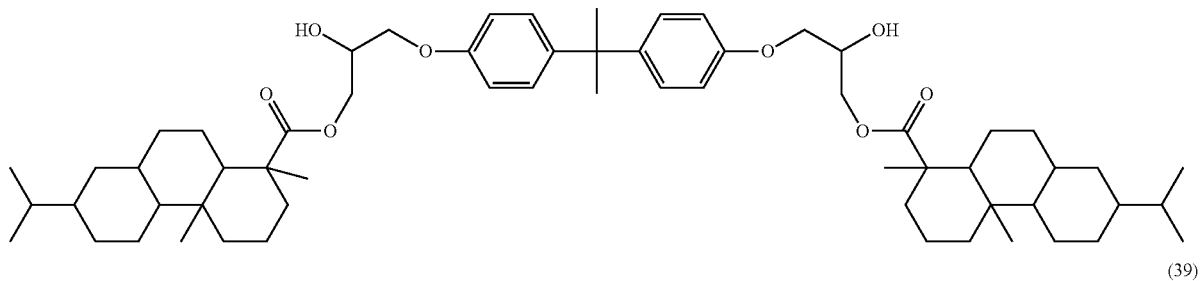
(38)
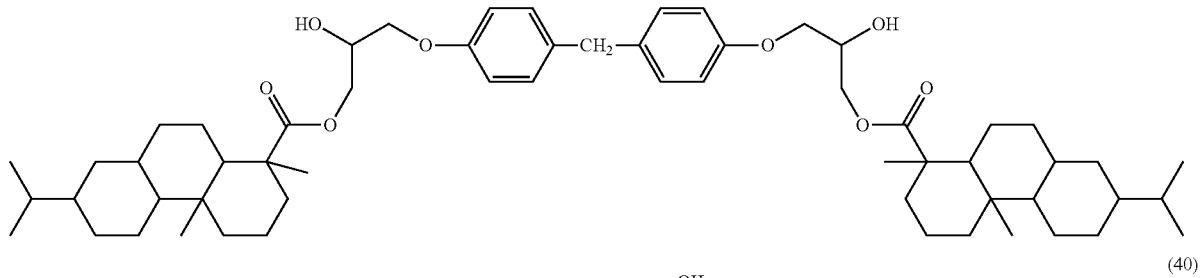
(39)
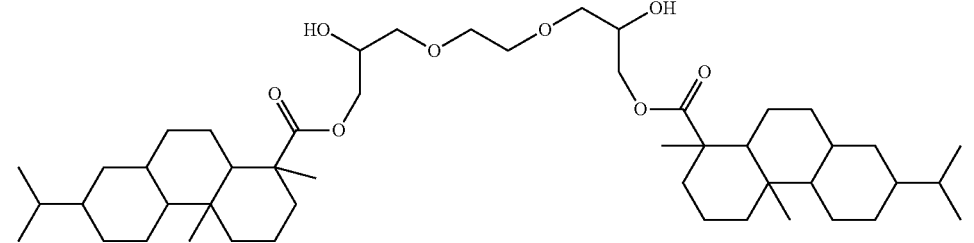
(40)

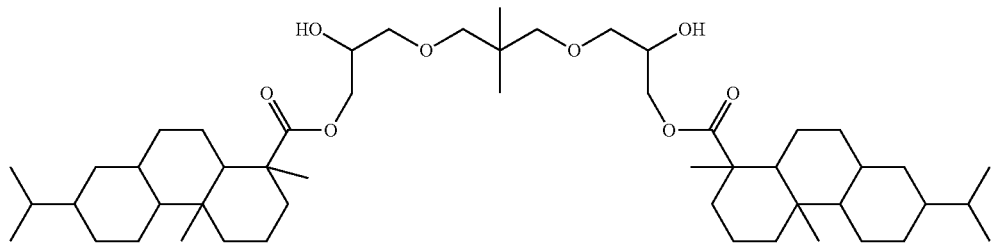

(41)

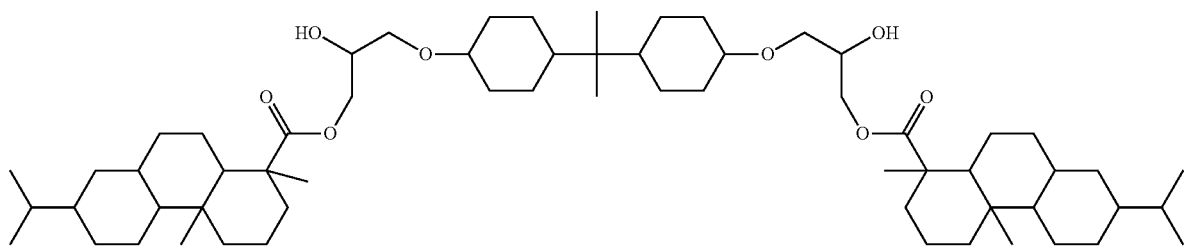

(42)

Carboxylic Acid Component

Polyvalent carboxylic acids may be used as the carboxylic acid component, and, for example, at least one selected from a group consisting of aromatic dicarboxylic acids and aliphatic dicarboxylic acids may be used as a dicarbonylic acid component. Examples thereof include aromatic dicarboxylic acids, such as phthalic acid, isophthalic acid, teraphthalic acid, 1,4-naphthalene dicarboxylic acid, and 2,6-naphthalene dicarboxylic acid; aliphatic dicarboxylic acids, such as oxalic acid, malonic acid, maleic acid, fumaric acid, citraconic acid, itaconic acid, glutaconic acid, succinic acid, adipic acid, sebacic acid, azelaic acid, dimer acid, alkyl succinic acid having a branched chain and from 1 to 20 carbon atoms, and alkenyl succinic acid having alkenyl groups having a branched chain and from 1 to 20 carbon atoms; anhydrides thereof; alkyl (having from 1 to 3 carbon atoms) esters thereof; and the like. Among the above, aromatic carboxylic acid compounds are preferable from the viewpoint of the durability and fixing properties of a toner and the dispersibility of a colorant.

Examples of tri or higher-valent carboxylic acids include specific aromatic carboxylic acids, such as 1,2,3-benzene tricarboxylic acid, 1,2,4-benzene tricarboxylic acid and 1,2,4-naphthalene tricarboxylic acid; anhydrides thereof, lower alkyl esters thereof; and the like. The tri or higher-valent carboxylic acids may be used singly or in combination of two or more kinds.

In addition, a dicarboxylic acid component having a sulfonic acid group may be included in addition to the aliphatic dicarboxylic acid or the aromatic dicarboxylic acid as the acid component.

Manufacturing Method of the Polyester Resin for a Toner

The polyester resin for a toner according to the exemplary embodiment is prepared through a well-known conventional manufacturing method using the carboxylic acid component and the alcohol component as raw materials. As the reaction method, any of an ester exchange reaction and a direct esterification reaction may be applied. In addition, polycondensation may be accelerated using a method in which the pressure is applied so as to increase the reaction temperature, a depressurization method, or a method in which inert gas is made to flow at a normal pressure. For some reactions, a well-known conventional reaction catalyst, such as at least one of metallic compound selected from antimony, titanium, tin, zinc, aluminum, and manganese, may be used so as to accelerate the reactions. The addition amount of the reaction catalyst is preferably 0.01 part by weight to 1.5 parts by weight, and more preferably 0.05 part by weight to 1.0 part by weight with respect to 100 parts by weight of the polyvalent carboxylic acid and the polyol in total. The reaction is carried out at a temperature of, for example, 180° C. to 300° C.

Meanwhile, when the polyester resin for a toner according to the exemplary embodiment is hydrolyzed, the polyester resin decomposes into the respective monomers (the polyvalent carboxylic acid component and the polyol component). Since the polyester resin for a toner is, for example, a condensate of 1:1 of the carboxylic acid component (for example, dicarboxylic acid) and the alcohol component (for example, diol), the configuration of the resin is assumed from decomposed materials.

Characteristics of the Polyester Resin for a Toner

The weight average molecular weight of the polyester resin for a toner according to the exemplary embodiment is preferably from 4000 to 1000000, and more preferably from 7000 to 300000 from the viewpoint of the durability and offset resistance of a toner.

Meanwhile, the weight average molecular weight of the polyester resin for a toner is measured using the following method.

Two columns of a "HLC-8120GPC," and a "SC-8020 (manufactured by Tosoh Corporation, 6.0 mm ID×15 cm)" are used, and tetrahydrofuran (THF) is used as an eluent. The experimental conditions are a sample concentration of 0.5%, a flow rate of 0.6 ml/min, an amount of sample injection of 10 µl, and a measurement temperature of 40° C., and the weight average molecular weight is measured using an RI detector. In addition, calibration curves are prepared from 10 samples of "Polystyrene standard sample TSK standard" manufactured by Tosoh Corporation: "A-500," "F-1," "F-10," "F-80," "F-380," "A-2500," "F-4," "F-40," "F-128," and "F-700."

The softening point of the polyester resin for a toner according to the exemplary embodiment is preferably from 80° C. to 160° C., and more preferably from 90° C. to 150° C. from the viewpoint of the fixing properties, storing properties, and durability of a toner.

Meanwhile, the softening point is obtained using a flow tester OFT-500 (manufactured by Shimadzu Corporation) under conditions of a pore diameter of a dice of 0.5 mm, a pressurization load of 0.98 MPa (10 Kg/cm$^2$), and a rate of temperature increase set to 1° C./min as a temperature that corresponds to half the height from an effusion-start point to an effusion-end point when 1 cm$^3$ of a sample is melted and effused.

The glass transition temperature of the polyester resin for a toner according to the exemplary embodiment is preferably from 35° C. to 80° C., and more preferably from 40° C. to 70° C. from the viewpoint of the fixing properties, storing properties, and durability of a toner. The softening point and the glass transition temperature are easily adjusted by adjusting the raw material monomer composition, a polymerization initiator, the molecular weight, the amount of a catalyst, and the like, and selecting reaction conditions.

Meanwhile, the glass transition temperature is measured using a "DSC-20" (manufactured by Seiko Denshi Kogyo Co., Ltd.) by heating 10 mg of a sample at a constant rate of temperature increase (10° C./rain).

The acid value of the polyester resin for a toner according to the exemplary embodiment is preferably from 1 mg KOH/g to 50 mg KOH/g, and more preferably from 3 mg KOH/g to 30 mg KOH/g from the viewpoint of the charging properties of a toner.

Meanwhile, the acid value is measured according to JIS K0070 using a neutralization titration method. That is, an appropriate amount of a sample is sampled, 100 ml of a solvent (a liquid mixture of diethyl ether and ethanol) and several drops of an indicator (phenolphthalein solution) are added, and the solution is shaken in a water bath until the sample dissolves. The solution is titrated using a 0.1 mol/l potassium hydroxide ethanol solution, and a point in time when the light red of the indicator remains for 30 seconds is used as the end point. The acid value is calculated using A−(B×f×5.611)/S in which A represents the acid value, S (g) represents the amount of the sample, B (ml) represents the 0.1 mol/l potassium hydroxide solution, and f represents the factor of the 0.1 mol/l potassium hydroxide ethanol solution.

The polyester resin for a toner according to the exemplary embodiment may be a denatured polyester resin. Examples of denatured polyester resins include polyester resins grafted or blocked using phenol, urethane, epoxy, or the like through the methods described in JP-A-11-133668, JP-A-10-239903, and JP-A-8-20636.

Electrostatic Charge Image Developing Toner

The electrostatic charge image developing toner (hereinafter sometimes referred to as the "toner") is configured to include the polyester resin for a toner according to the exemplary embodiment.

Hereinafter, the toner according to the exemplary embodiment will be described in detail.

The toner according to the exemplary embodiment is configured to have, for example, toner particles and external additives according to necessity.

Toner Particles

The toner particles will be described.

The toner particles are configured to include a binder resin, according to necessity, a colorant, a release agent, and other additives.

In addition, an amorphous resin may be used as the binder resin, and the polyester resin for a toner according to the exemplary embodiment is applied as an amorphous resin.

A crystalline resin may be used in combination with an amorphous resin as the binder resin.

An amorphous resin other than the polyester resin for a toner according to the exemplary embodiment may be used in combination with the polyester resin for a toner according to the exemplary embodiment as the binder resin.

The content of the polyester resin for a toner according to the exemplary embodiment is preferably 70 parts by weight or more, and more preferably 90 parts by weight or more with respect to 100 parts by weight of the entire binder resin.

Here, the amorphous resin refers to a resin which shows no clear endothermic peak in thermal analysis measurement using differential scanning calorimetry (DSC), has only a step-like endothermic change, is solid at room temperature (for example, 25° C.), and becomes thermoplastic at the glass transition temperature or higher.

Meanwhile, the crystalline resin refers to a resin which has not a step-like endothermic change but clear endothermic peaks in differential scanning calorimetric (DSC) measurement.

Specifically, the crystalline resin means that, for example, the half-value widths of endothermic peaks are 10° C. or less when the half-value widths are measured at a rate of temperature increase of 10° C./min, and the amorphous resin refers to a resin having a half-value width of more than 10° C. or a resin in which evident endothermic peaks are not observed.

Examples of the crystalline resin include crystalline polyester resins, polyalkyene resins, long-chain alkyl (meth)acrylate resins, and the like, and crystalline polyester resins are desirable since an abrupt change in viscosity due to heating is more easily exhibited, and, furthermore, both mechanical strength and low-temperature fixing properties are satisfied.

The crystalline polyester resin is preferably, for example, a polycondensate of an aliphatic dicarboxylic acid (including an acid anhydride and an acid chloride thereof) and an aliphatic diol from the viewpoint of realizing low-temperature fixing properties.

The content of the crystalline resin is preferably from 1 part by weight to 20 parts by weight, and more preferably from 5 parts by weight to 15 parts by weight with respect to 100 parts by weight of the entire binder resin.

Meanwhile, low-temperature fixing in the exemplary embodiment means that the toner is heated so as to be fixed at approximately 120° C. or lower.

Examples of other amorphous resin include well-known binder resins; for example, vinyl-based resins such as styrene-acrylic resin, epoxy resins, polycarbonate, and polyurethane.

Colorant

The colorant may be, for example, a dye or a pigment, but a pigment is desirable from the viewpoint of light resistance or water resistance.

Examples of the colorant that may be used include well-known pigments, such as carbon black, aniline black, aniline blue, calco oil blue, chrome yellow, ultramarine blue, Du Pont oil red, quinoline yellow, methylene blue chloride, phthalocyanine blue, malachite green oxalate, lampblack, rose bengal, quinacridone, benzidine yellow, C.I. Pigment Red 48:1, C.I. Pigment Red 57:1, C.I. Pigment Red 122, C.I. Pigment Red 185, C.I. Pigment Red 238, C.I. Pigment Yellow 12, C.I. Pigment Yellow 17, C.I. Pigment Yellow 180, C.I. Pigment Yellow 97, C.I. Pigment Yellow 74, C.I. Pigment Blue 15:1, C.I. Pigment Blue 15:3, and the like.

As the colorant, a colorant which has undergone a surface treatment as necessary may be used, or a pigment dispersant may be used.

A yellow toner, a magenta toner, a cyan toner, a black toner, or the like is obtained by selecting the kind of the colorant.

The content of the colorant is preferably in a range of 1 part by weight to 30 parts by weight with respect to 100 parts by weight of the binder resin.

Release Agent

Examples of the release agent include paraffin waxes, such as low-molecular-weight polypropylene and low-molecular-weight polyethylene; silicone resins; rosins; rice waxes; carnauba waxes, and the like. The melting temperature of the release agent is preferably from 50° C. to 100° C., and more preferably from 60° C. to 95° C.

The content of the release agent is preferably from 0.5 part by weight to 15 parts by weight, and more preferably from 1.0 part by weight to 12 parts by weight with respect to 100 parts by weight of the binder resin.

When the content of the release agent is 0.5 part by weight or more, particularly, occurrence of poor separation is prevented during oilless fixing. When the content of the release agent is 15% by weight or less, image qualities and reliance for image formation improve without deteriorating the fluidity of the toner.

Other Additives

A well-known agent may be used as a charge-controlling agent, and an azo-based metallic complex compound, a metallic complex compound of salicylic acid, and a resin-type charge-controlling agent containing a polar group may also be used.

Characteristics of Toner Particles

The toner particles may be single layer-structured toner particles or so-called core and shell-structured toner particles composed of a core portion (core particles) and a coating layer that coats the core portion (shell layer).

The toner particles of core-shell structure are preferably composed of, for example, a core portion that is configured to include a binder resin (the polyester resin according to the exemplary embodiment and a crystalline polyester resin) and other additives, such as a colorant and a release agent, as necessary; and a coating layer configured to include a binder resin (the polyester resin according to the exemplary embodiment).

The volume average particle diameter of the toner particles is preferably, for example, from 2.0 µm to 10 µm, and more preferably from 3.5 µm to 7.0 µm.

Meanwhile, the volume average particle diameter of the toner particles is measured in the following manner: 0.5 mg to 50 mg of a measurement sample is added to a surfactant, preferably 2 ml of a 5% by weight aqueous solution of sodium alkylbenzene sulfonate as a dispersant, and the solution is added to 100 ml to 150 ml of an electrolytic solution. A dispersion treatment is carried out for approximately 1 minute on the electrolytic solution in which the measurement sample is suspended using an ultrasonic dispersion device, and the particle size distribution of particles having a particle diameter in a range of 2.0 µm to 60 µm is measured using a Coulter Multisizer II (manufactured by Beckman Coulter, Inc.) and an aperture having an aperture diameter of 100 µm. The number of particles being measured is set to 50,000.

A volume cumulative distribution is drawn from the small particle diameter side on particle size ranges (channels) divided on the basis of the obtained particle size distribution, and a particle diameter at a cumulative distribution of 50% is set as the volume average particle size D50v.

The shape factor SF1 of the toner particles is preferably, for example, from 110 to 150, and more preferably from 120 to 140.

Here, the shape factor SF1 is obtained using the following formula (1).

$$SF1 = (ML^2/A) \times (\pi/4) \times 100 \qquad \text{formula (1)}$$

In the above formula (1), ML represents the absolute maximum length of the toner, and A represents the projected area of the toner respectively.

Meanwhile, SF1 is digitalized mainly through analyses of microscopic images or scanning electron microscopic (SEM) images using an image analyzing apparatus, and calculated, for example, in the following manner. That is, an optical microscopic image of particles dispersed on the surface of a glass slide is scanned into a LUZEX image-analyzing apparatus using a video camera, the maximum length and projected area of 100 particles are obtained, shape factors are calculated using the above formula (1), and the average value is obtained, thereby obtaining the SF1.

External Additives

Examples of the external additives include inorganic particles, and examples of the inorganic particles include $SiO_2$, $TiO_2$, $Al_2O_3$, $CuO$, $ZnO$, $SnO_2$, $CeO_2$, $Fe_2O_3$, $MgO$, $BaO$, $CaO$, $K_2O$, $Na_2O$, $ZrO_2$, $CaO \cdot SiO_2$, $K_2O \cdot (TiO_2)_n$, $Al_2O_3 \cdot 2SiO_2$, $CaCO_3$, $MgCO_3$, $BaSO_4$, $MgSO_4$, and the like.

The surfaces of the inorganic particles as an external additive may have undergone a hydrophobizing treatment in advance. The hydrophobizing treatment is carried out by, for example, dipping the inorganic particles in a hydrophobizing agent. The hydrophobizing agent is not particularly limited, and examples thereof include silane-based coupling agents, silicone oil, titanate-based coupling agents, aluminum-based coupling agents, and the like. The hydrophobizing agent may be used singly or in combination with two or more kinds.

The amount of the hydrophobizing agent is generally, for example, approximately 1 part by weight to 10 parts by weight with respect to 100 parts by weight of the inorganic particles.

Examples of the external additives also include resin particles (resin particles of polystyrene, PMMA, a melamine resin, and the like), a cleaning lubricant (for example, metallic salts of higher aliphatic acids which are represented by zinc stearate, or particle powder of a fluorine-based polymer), and the like.

The addition amount of the external additive is preferably, for example, from 0.01 part by weight to 5 parts by weight, and more preferably from 0.01 part by weight to 2.0 parts by weight with respect to 100 parts by weight of the toner particles.

Manufacturing Method of a Toner

Hereinafter, the manufacturing method of a toner according to the exemplary embodiment will be described.

Firstly, toner particles may be manufactured using any of dry manufacturing methods (for example, a kneading and pulverizing method or the like) and wet manufacturing methods (for example, an aggregation and coalescence method, a suspension polymerization method, a melting suspension granulation method, a melting suspension method, a melting emulsification aggregation and coalescence method, or the like). The manufacturing method is not particularly limited, and a well-known manufacturing method is employed.

Among the above, toner particles are preferably obtained using an aggregation and coalescence method.

Specifically, toner particles are obtained in the following manner.

Meanwhile, in the following description, a method of obtaining toner particles including a colorant and a release agent will be described, but the colorant and the release agent are used as necessary. Needless to say, additives other than the colorant and the release agent may also be used.

Resin particle dispersion liquid preparation process

Firstly, together with a resin particle dispersion liquid in which polyester resin particles are dispersed, for example, a colorant particle dispersion liquid in which colorant particles are dispersed and a release agent dispersion liquid in which release agent particles are dispersed are prepared.

Here, the resin particle dispersion liquid is prepared by, for example, dispersing the polyester resin particles in a dispersion medium using a surfactant.

Examples of the dispersion medium used in the resin particle dispersion liquid include aqueous media.

Examples of the aqueous media include water, such as distilled water and ion exchange water, alcohols, and the like. The aqueous media may be used singly or in combination of two or more kinds.

The surfactant is not particularly limited, and examples thereof include anionic surfactants, such as sulfate ester salt-based, sulfonate-based, phosphate ester-based, and soap-based anionic surfactants; cationic surfactants, such as amine salt-based and quaternary ammonium salt-based cationic surfactants; nonionic surfactants, such as polyethylene glycol-based, alkyl phenol ethylene oxide adduct-based, and polyol-based nonionic surfactants; and the like. Among the above, examples thereof particularly include anionic surfactants and cationic surfactants. The nonionic surfactant may be used in combination with the anionic surfactant or the cationic surfactant.

The surfactant may be used singly or in combination with two or more kinds.

For the resin particle dispersion liquid, an ordinary dispersion method using, for example, a rotary shearing homogenizer, a ball mill, a sand mill, a dyno mill which have media, or the like is used to disperse the polyester resin particles in a dispersion medium. In addition, according to the kind of resin particles being used, the resin particles may be dispersed in the resin particle dispersion liquid using, for example, a phase-transfer emulsification method.

Meanwhile, the phase-transfer emulsification method is a method in which a resin to be dispersed is dissolved in a hydrophobic organic solvent in which the resin may be dissolved, neutralized by adding a base to an organic continuous phase (O phase), and then an aqueous medium (W phase) is injected, whereby the resin transforms (so-called phase transfer) from W/O to O/W so as to become a discontinuous phase, and the resin is dispersed in the aqueous medium in a particle shape.

The volume average particle diameter of the polyester resin particles that are dispersed in the resin particle dispersion liquid is, for example, in a range of 0.01 μm to 1 μm, preferably 0.08 μm to 0.8 μm, and 0.1 μm to 0.6 μm.

Meanwhile, the volume average particle diameter of the resin particles is measured using a laser diffraction particle size distribution measuring apparatus (manufactured by Horiba Ltd., LA-920). Hereinafter, the volume average particle diameter of particles will be measured in the same manner unless otherwise described.

The content of the polyester resin particles included in the resin particle dispersion liquid is, for example, 5% by weight to 50% by weight, and may be 10% by weight to 40% by weight.

Meanwhile, in the same manner as for the resin particle dispersion liquid, for example, a colorant dispersion liquid and a release agent dispersion liquid are also prepared. That is, the volume average particle diameter of the particles, the dispersion medium, the dispersing method, and the content of the particles for the resin particle dispersion liquid are similarly applied to colorant particles that are dispersed in the colorant dispersion liquid and release agent particles that are dispersed in the release agent dispersion liquid.

Aggregated Particle-Forming Process

Next, the colorant particle dispersion liquid and the release agent dispersion liquid are mixed with the resin particle dispersion liquid.

In addition, heteroaggregation of the polyester resin particles, the colorant particles, and the release agent particles is caused in the dispersion liquid mixture so as to form aggregated particles having a diameter that is close to that of the target toner particles and including the polyester resin particles, the colorant particles, and the release agent particles.

Specifically, for example, an aggregating agent is added to the dispersion liquid mixture, the pH of the dispersion liquid mixture is adjusted to be acidic (for example, a pH of 2 to 5), a dispersion stabilizer is added as necessary, then, the solution is heated to a temperature of the glass transition temperature (specifically, for example, 30° C. lower than the glass transition temperature of the polyester resin particles to 10° C. lower than the glass transition temperature) of the polyester resin particles, and the particles dispersed in the dispersion liquid mixture are aggregated, thereby forming aggregated particles.

In the aggregated particle-forming process, for example, the above heating may be carried out after adding the aggregating agent at room temperature (for example, 25° C.) while the dispersion liquid mixture is stirred using a rotary shearing homogenizer, adjusting the pH of the dispersion liquid mixture to be acidic (for example, a pH of 2 to 5), and adding a dispersion stabilizer as necessary.

Examples of the aggregating agent include surfactants having a reverse polarity with respect to the surfactant used as the dispersant that is added to the dispersion liquid mixture, such as inorganic metallic salts and di or higher-valent metallic complexes. Particularly, in a case in which a metallic complex is used as the aggregating agent, the amount of the surfactant being used is reduced, and charging characteristics improve.

An additive that forms a complex or a similar bond with the metallic ion of the aggregating agent may be used as necessary. A chelate agent is preferably used as the additive.

Examples of the inorganic metallic salt include metallic salts, such as calcium chloride, calcium nitrate, barium chloride, magnesium chloride, zinc chloride, aluminum chloride, and aluminum sulfate; inorganic metallic salt polymers, such as polyaluminum chloride, polyaluminum hydroxide, and calcium polysulfide; and the like.

A water-soluble chelate agent may be used as the chelate agent. Examples of the chelate agent include oxycarboxylic acids, such as acidum tartaricum, citric acid, and gluconic acid; iminodiacetic acid (IDA), nitrilotriacetic acid (NTA), ethylenediaminetetraacetic acid (EDTA), and the like.

The addition amount of the chelate agent is, for example, in a range of 0.01 part by weight to 5.0 parts by weight, and may be 0.1 part by weight to less than 3.0 parts by weight with respect to 100 parts by weight of the polyester resin particles.

Coalescence Process

Next, the aggregated particle dispersion liquid in which the aggregated particles are dispersed is heated to, for example, the glass transition temperature of the polyester resin particles or higher (for example, a temperature that is 10° C. to 30° C. higher than the glass transition temperature of the polyester resin particles or higher) so as to coalesce the aggregated particles, thereby forming toner particles.

The toner particles are obtained through the above processes.

Meanwhile, the toner particles may be manufactured by undergoing, after the aggregated particle dispersion liquid in which the aggregated particles are dispersed is obtained, a process in which the aggregated particle dispersion liquid and the resin particle dispersion liquid in which the polyester resin particles (the particles of the polyester resin according to the exemplary embodiment) are dispersed are further mixed, the polyester resin particles are further aggregated so as to be attached to the surfaces of the aggregated particles, thereby forming second aggregated particles, and a process in which a second aggregated particle dispersion liquid in which the second aggregated particles are dispersed is heated, and the second aggregated particles are coalesced, thereby forming toner particles of core-shell structure.

Here, after the end of the coalescence process, the toner particles formed in the solution are subjected to well-known washing process, solid and liquid separation process, and drying process so as to obtain dried toner particles.

In the washing process, it is desirable to sufficiently carry out displacement washing using deionized water in terms of charging properties. In addition, the solid and liquid separation process is not particularly limited, but suction filtration, pressurization filtration, or the like is preferably used in terms of productivity. Furthermore, the drying process is not particularly limited, but freeze drying, flash jet drying, fluidized drying, oscillatory fluidized drying, or the like is preferably used in terms of productivity.

In addition, the toner according to the exemplary embodiment is manufactured by, for example, adding an external additive to the obtained dried toner particles, and mixing both. The mixing is preferably carried out using, for example, a V blender, a Henschell mixer, a Loedige mixer, or the like. Furthermore, as necessary, coarse particles of the toner may be removed using an oscillatory sieving machine, a wind classifier, or the like.

Electrostatic Charge Image Developer

The electrostatic charge image developer according to the exemplary embodiment includes at least the toner according to the exemplary embodiment.

The electrostatic charge image developer according to the exemplary embodiment may be a single-component developer including only the toner according to the exemplary embodiment or a two-component developer in which the toner and a carrier are mixed.

The carrier is not particularly limited, and includes well-known carriers. Examples of the carrier include a resin-coated carrier, a magnetic dispersion carrier, a resin dispersion carrier, and the like.

In the two-component developer, the mixing ratio (weight ratio) between the toner according to the exemplary embodiment and the carrier is preferably in a range of toner:carrier=approximately 1:100 to 30:100, and more preferably in a range of approximately 3:100 to 20:100.

Image Forming Apparatus and Image Forming Method

Next, the image forming apparatus and the image forming method according to the exemplary embodiment will be described.

The image forming apparatus according to the exemplary embodiment has an image holding member, a charging unit that charges a surface of the image holding member, an electrostatic charge image forming unit that forms an electrostatic charge image on the surface of the image holding member, a developing unit that accommodates an electrostatic charge image developer, and develops the electrostatic charge image using the electrostatic charge image developer so as to form a toner image, a transferring unit that transfers the toner image to a recording medium, and a fixing unit that fixes the toner image to the recording medium. In addition, the electrostatic charge image developer according to the exemplary embodiment is applied as the electrostatic charge image developer.

Meanwhile, in the image forming apparatus according to the exemplary embodiment, the portion including the developing unit may have, for example, a cartridge structure (process cartridge) that is detachable from the image forming apparatus, and, as the process cartridge, for example, a process cartridge which accommodates the electrostatic charge image developer according to the exemplary embodiment and has the developing unit is preferably used.

The image forming method according to the exemplary embodiment includes charging a surface of an image holding member, forming an electrostatic charge image on the surface of the image holding member, developing the electrostatic charge image using an electrostatic charge image developer so as to form a toner image, transferring the toner image to a recording medium, and fixing the toner image to the recording medium. In addition, the electrostatic charge image developer according to the exemplary embodiment is applied as the electrostatic charge image developer.

Hereinafter, an example of the image forming apparatus according to the exemplary embodiment will be shown, but the image forming apparatus is not limited thereto. Meanwhile, major portions shown in the drawing will be described, and other portions will not be described.

FIG. 1 is a schematic configuration view showing a 4 tandem-type color image forming apparatus. The image forming apparatus shown in FIG. 1 has first to fourth electrophotographic image forming units 10Y, 10M, 10C, and 10K (image forming units) that output images of the respective colors of yellow (Y), magenta (M), cyan (C), and black (K) based on color-separated image date. The image forming units (hereinafter sometimes referred to simply as the "units") 10Y, 10M, 10C, and 10K are provided in series in the horizontal direction at predetermined intervals. Meanwhile, the units 10Y, 10M, 10C, and 10K may be process cartridges that are detachable from the major member of the image forming apparatus.

An intermediate transferring belt 20 extends as an intermediate transferring member through the respective units above the respective units 10Y, 10M, 10C, and 10K in the drawing. The intermediate transferring belt 20 is supported by a driving roller 22 and a supporting roller 24 that is in contact with the inside surface of the intermediate transferring belt 20 which are disposed with a gap therebetween from the left to the right in the drawing, and is configured to run in a direction from the first unit 10Y to the fourth unit 10K. Further, a force is applied to the supporting roller 24 in a direction away from the driving roller 22 using a spring or the like, not shown, so that a tension is supplied to the intermediate transferring belt 20 supported by both. In addition, an intermediate transferring member cleaning apparatus 30 is provided opposite to the driving roller 22 on the side of the intermediate transferring belt 20 that faces the image holding member.

In addition, developing apparatuses (developing units) 4Y, 4M, 4C, and 4K of the respective units 10Y, 10M, 10C, and 10K are supplied with toners of 4 colors of yellow, magenta, cyan, and black which are accommodated in toner cartridges 8Y, 8M, 8C, and 8K.

Since the first to fourth units 10Y, 10M, 10C, and 10K have equivalent configurations, herein, the first unit 10Y which is disposed on the upstream side in the intermediate transferring belt running direction, and forms yellow images will be representatively described. Further, equivalent portions to the first unit 10Y will be given reference signs to which magenta (M), cyan (C), and black (K) are attached instead of yellow (Y), and therefore the second to fourth units 10M, 10C, and 10K will not be described.

The first unit 10Y has a photoreceptor 1Y that acts as an image holding member. Around the photoreceptor 1Y, a charging roller 2Y that charges the surface of the photoreceptor 1Y to a predetermined potential, an exposure apparatus (electrostatic charge image forming unit) 3 that exposes the charged surface based on color-separated image signals using laser beams 3Y so as to form an electrostatic charge image, a developing apparatus (developing unit) 4Y that supplies a charged toner to the electrostatic charge image so as to develop the electrostatic charge image, a primary transferring roller 5Y (primary transferring unit) that transfers the developed toner image to the intermediate transferring belt 20, and a photoreceptor cleaning apparatus (cleaning unit) 6Y that removes the toner remaining on the surface of the photoreceptor 1Y after primary transferring are sequentially disposed.

Further, the primary transferring roller 5Y is disposed inside the intermediate transferring belt 20, and is provided at a location opposite to the photoreceptor 1Y. Furthermore, bias power supplies (not shown) that apply primary transferring biases are connected to the respective primary transferring rollers 5Y, 5M, 5C, and 5K respectively. The respective bias power supplies change transferring biases applied to the respective primary transferring rollers through the control by a control portion, not shown.

Hereinafter, an operation of forming a yellow image in the first unit 10Y will be described. Firstly, prior to the operation, the surface of the photoreceptor 1Y is charged to a potential of approximately −600 V to −800 V using the charging roller 2Y.

The photoreceptor 1Y is formed by laminating photosensitive layers on a conductive (volume resistivity at 20° C.: $1 \times 10^{-6}$ Ωcm or less) base material. The photosensitive layer generally has a high resistance (approximately the resistance of an ordinary resin), but has a property of changing the specific resistance, upon irradiation of the laser beam 3Y, at a portion irradiated with the laser beam. Therefore, the laser beam 3Y is outputted to the charged surface of the photoreceptor 1Y through the exposure apparatus 3 according to yellow image data sent from the control portion, not shown. The photosensitive layer on the surface of the photoreceptor 1Y is irradiated with the laser beam 3Y, and thus a yellow printing patterned electrostatic charge image is formed on the surface of the photoreceptor 1Y.

The electrostatic charge image is an image formed on the surface of the photoreceptor 1Y through charging, and is a so-called negative latent image formed by lowering the specific resistances at portions on the photosensitive layer irradiated with the laser beam 3Y, flowing charged electric charges on the surface of the photoreceptor 1Y, and, on the other hand, leaving electric charges at portions which is not irradiated with the laser beam 3Y.

The electrostatic charge image formed on the photoreceptor 1Y in the above manner is rotated to a predetermined developing location in accordance with running of the photoreceptor 1Y. In addition, the electrostatic charge image on the photoreceptor 1Y is visualized (developed) using the developing apparatus 4Y at the developing location.

In the developing apparatus 4Y, for example, the electrostatic charge image developer according to the exemplary embodiment which includes at least a yellow toner and a carrier is accommodated. The yellow toner is stirred inside the developing apparatus 4Y so as to be friction-charged, and is held on a developer roll (developer holding member) with electric charges having the same polarity (negative polarity) as the charged electric charges on the photoreceptor 1Y. In addition, the surface of the photoreceptor 1Y passes through the developing apparatus 4Y so that the yellow toner is electrostatically attached to a neutralized latent image portion on the surface of the photoreceptor 1Y, and a latent image is developed using the yellow toner. Subsequently, the photoreceptor 1Y on which the yellow toner image is formed runs at a predetermined rate, and the toner image developed on the photoreceptor 1Y is transported to a predetermined primary transferring location.

When the yellow toner image on the photoreceptor 1Y is transported to the primary transferring location, a primary transferring bias is applied to the primary transferring roller 5Y, an electrostatic force toward the primary transferring roller 5Y from the photoreceptor 1Y is exerted on the toner image, and the toner image on the photoreceptor 1Y is transferred to the intermediate transferring belt 20. At this time, the applied transferring bias has a positive polarity which is opposite to the negative polarity of the toner, and is controlled to approximately +10 μA using the control portion (not shown) in the first unit 10Y for example.

Meanwhile, the toner remaining on the photoreceptor 1Y is removed and collected in the cleaning apparatus 6Y.

In addition, primary transferring biases applied to the primary transferring rollers 5M, 5C, and 5K after the second unit 10M are also controlled according to the first unit.

The intermediate transferring belt 20 to which the yellow toner image has been transferred in the above manner in the first unit 10Y is sequentially transported through the second to fourth units 10M, 10C, and 10K, and toner images of the respective colors are overlapped and multiply transferred.

The intermediate transferring belt 20 to which the toner images of 4 colors are multiply transferred through the first to fourth units reaches a secondary transferring portion constituted by the intermediate transferring belt 20, the supporting roller 24 that is in contact with the inside of the intermediate transferring belt, and a secondary transferring roller (secondary transferring unit) 26 disposed on the image holding surface side of the intermediate transferring belt 20. Meanwhile, recording paper (recording medium) P is fed into a gap between the secondary transferring roller 26 and the intermediate transferring belt 20 in pressure contact with each other at a predetermined timing using a feeding mechanism, and a secondary transferring bias is applied to the supporting roller 24. At this time, the applied transferring bias has a negative polarity which is identical to the negative polarity of the toner, an electrostatic force toward the recording paper P from the intermediate transferring belt 20 is exerted on the toner image, and the toner image on the intermediate transferring belt 20 is transferred to the recording paper P. Further, the secondary transferring bias at this time is determined in accordance with a resistance detected using a resistance detecting unit (not shown) that detects the resistance of the secondary transferring portion, and is voltage-controlled.

After this, the recording paper P is sent into a pressure contact portion (nipping portion) between a pair of fixing rolls in a fixing apparatus (roll-shaped fixing unit) 28, and the toner image is fixed on the recording paper 2, thereby forming a fixed image.

Examples of the recording medium to which the toner image is transferred include ordinary paper, OHP sheets, and the like which are used in electrophotographic copy machines, printers, and the like.

In order to further improve the smoothness of the image surface after fixing, the surface of the recording medium is also preferably smooth, and, for example, coated paper manufactured by coating the surface of ordinary paper using a resin or the like, printing art paper, and the like are preferably used.

The recording paper P on which a color image is completely fixed is transported toward an ejection portion, and a series of color image forming operations are ended.

Meanwhile, the above exemplified image forming apparatus is configured to transfer the toner image to the recording paper P through the intermediate transferring belt 20, but the configuration is not limited thereto, and the image forming apparatus may have a configuration in which a toner image is directly transferred to recording paper from a photoreceptor.

Process Cartridge and Toner Cartridge

The process cartridge according to the exemplary embodiment includes a developing unit that accommodates the electrostatic charge image developer according to the exemplary embodiment, and develops an electrostatic charge image formed on a surface of an image holding member using the electrostatic charge image developer so as to form a toner image, which is detachable from an image forming apparatus.

Figure 2:
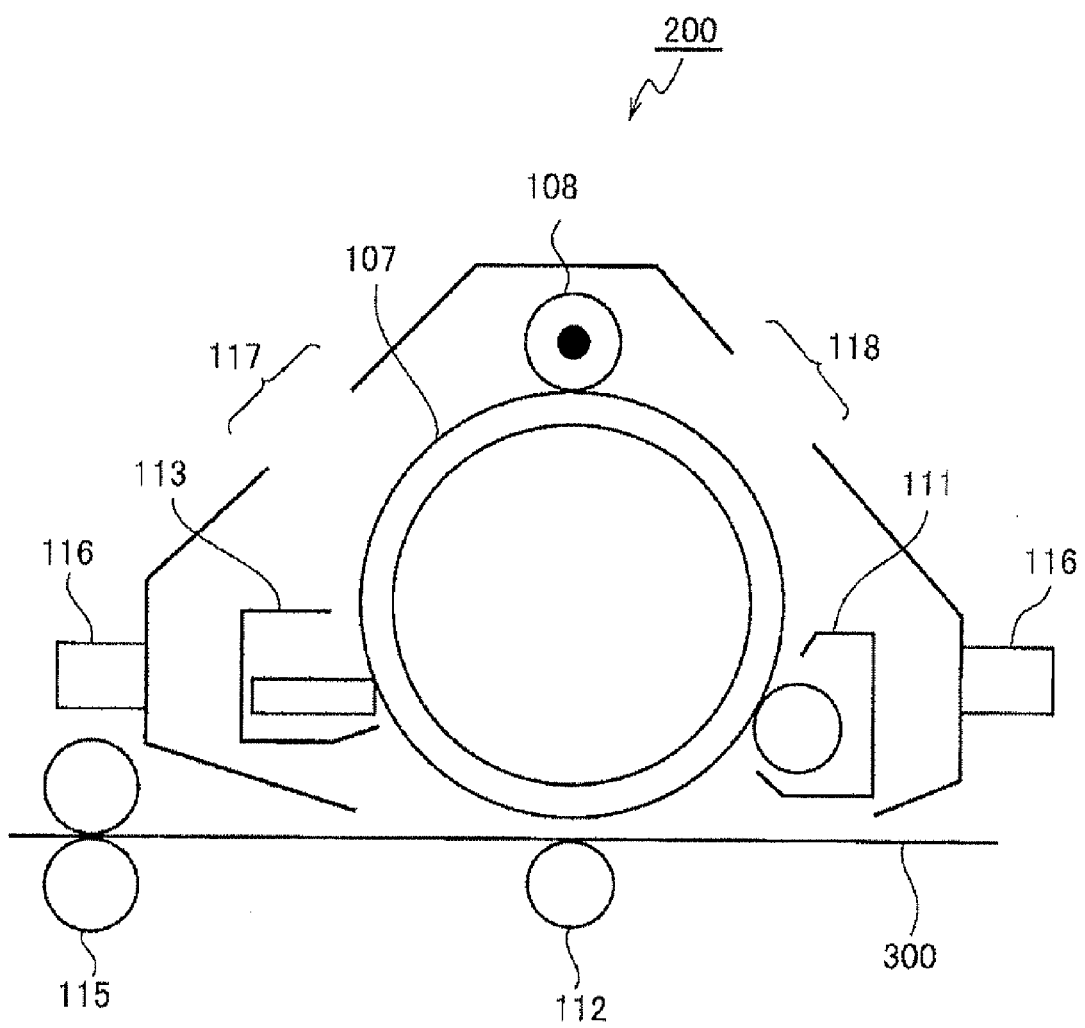
FIG. 2 is a schematic configuration view showing an example of a process cartridge according to the exemplary embodiment.

FIG. 2 is a schematic configuration view showing a preferable example of an embodiment of a process cartridge that accommodates the electrostatic charge image developer according to the exemplary embodiment. A process cartridge 200 has a charging roller 108, a developing apparatus 111, a photoreceptor cleaning apparatus 113, an opening for exposure 118, and an opening for erasing exposure 117 combined using an attaching rail 116 and integrated with a photoreceptor 107. Meanwhile, reference numeral 300 indicates a recording medium in FIG. 2.

In addition, the process cartridge 200 is freely detachable from an image forming apparatus constituted by a transferring apparatus 112, a fixing apparatus 115, and other components, not shown.

The process cartridge 200 shown in FIG. 2 has the charging apparatus 108, the developing apparatus 111, the cleaning apparatus 113, the opening for exposure 118, and the opening for erasing exposure 117, but these apparatuses may be selectively combined. The process cartridge according to the exemplary embodiment has at least one selected from a group consisting of the charging apparatus 108, the developing apparatus 111, the cleaning apparatus (cleaning unit) 113, the opening for exposure 118, and the opening for erasing exposure 117 in addition to the photoreceptor 107.

Next, the toner cartridge according to the exemplary embodiment will be described. The toner cartridge according to the exemplary embodiment is a toner cartridge which is detachable from an image forming apparatus, and accommodates at least a replenishing electrostatic charge image developing toner for supplying to a developing unit provided in the image forming apparatus.

Meanwhile, the image forming apparatus shown in FIG. 1 is an image forming apparatus having a configuration in which toner cartridges 8Y, 8M, 8C, and 8K are detachable, and developing apparatuses 4Y, 4M, 4C, and 4K are connected to toner cartridges that correspond to the respective developing apparatuses (colors) using toner supply pipes, not shown. In addition, in a case in which the amount of the toner accommodated in the toner cartridge is small, the toner cartridge is replaced.

EXAMPLES

Hereinafter, the exemplary embodiment will be described specifically using examples, but the exemplary embodiment will not be limited to examples shown below. Meanwhile, in the examples, "parts" and "%" indicate "parts by weight" and "% by weight" unless otherwise described.

Alcohol 1,4-Cyclohexanedimethanol rosin (CHDM-R, specific rosin diol A)

1,4-cyclohexanedimethanol diglycidyl ether (75 parts, trade name: EX-216L, manufactured by Nagase ChemteX Corporation) as a bifunctional epoxy compound, purified rosin which has undergone a purification treatment (200 parts, trade name: PINE CRYSTAL KR614, manufactured by Arakawa Chemical industries, Ltd.) as a rosin component, and tetraethylammonium bromide (0.4 part, manufactured by Tokyo Chemical Industry Co., Ltd.) as a reaction catalyst are put into a stainless steel reaction vessel having a stirring apparatus, a heating apparatus, a cooling pipe, and a thermometer, the temperature is increased to 130° C., and a ring-opening reaction between the acidic group in the rosin and the epoxy group in the epoxy compound is caused. The reaction continues at the same temperature over 4 hours, and the reaction is stopped at a point in time when the acid value becomes 0.5 mg KOH/g, thereby obtaining 1,4-cyclohexanedimethanol rosin.

1,2-Cyclohexanedicarboxylic acid rosin (CHDC-R, specific rosin diol A)

1,2-Cyclohexanedicarboxylic acid diglycidyl ether (142 parts) as a bifunctional epoxy compound, disproportionated rosin (200 parts, trade name: PINE CRYSTAL KR614, manufactured by Arakawa Chemical industries, Ltd.) as a rosin component, and tetraethylammonium bromide (0.4 part, manufactured by Tokyo Chemical Industry Co., Ltd.) as a reaction catalyst are put into a stainless steel reaction vessel having a stirring apparatus, a heating apparatus, a cooling pipe, and a thermometer, the temperature is increased to 130° C., and a ring-opening reaction between the acidic group in the rosin and the epoxy group in the epoxy compound is caused. The reaction continues at the same temperature over 4 hours, and the reaction is stopped at a point in time when the acid value becomes 0.5 mg KOH/g, thereby obtaining 1,2-cyclohexanedicarboxylic acid rosin.

Hydrogenated Bisphenol A Rosin (HBPA-R, Specific Rosin Diol A)

Hydrogenated bisphenol A diglycidyl ether (107 parts, trade name: EX-252, manufactured by Nagase ChemteX Corporation) as a bifunctional epoxy compound, disproportionated rosin (200 parts, trade name: PINE CRYSTAL KR614, manufactured by Arakawa Chemical industries, Ltd.) as a rosin component, and tetraethylammonium bromide (0.4 part, manufactured by Tokyo Chemical Industry Co., Ltd.) as a reaction catalyst are put into a stainless steel reaction vessel having a stirring apparatus, a heating apparatus, a cooling pipe, and a thermometer, the temperature is increased to 130° C., and a ring-opening reaction between the acidic group in the rosin and the epoxy group in the epoxy compound is caused. The reaction continues at the same temperature over 4 hours, and the reaction is stopped at a point in time when the acid value becomes 0.5 mg KOH/g, thereby obtaining hydrogenated bisphenol A rosin.

Propanediol Rosin (PD-R, Specific Rosin Diol B)

Propanediol diglycidyl ether (64 parts) as a bifunctional epoxy compound, purified rosin which has undergone a purification treatment (200 parts) as a rosin component, and tetraethylammonium bromide (0.4 part, manufactured by Tokyo Chemical Industry Co., Ltd.) as a reaction catalyst are put into a stainless steel reaction vessel having a stirring apparatus, a heating apparatus, a cooling pipe, and a thermometer, the temperature is increased to 130° C., and a ring-opening reaction between the acidic group in the rosin and the epoxy group in the epoxy compound is caused. The reaction continues at the same temperature over 4 hours, and the reaction is stopped at a point in time when the acid value becomes 0.5 mg KOH/g, thereby obtaining propanediol rosin.

Ethylene Glycol Rosin (EG-R, Specific Rosin Diol B)

Ethylene glycol diglycidyl ether (57 parts, trade name: EX-810, manufactured by Nagase ChemteX Corporation) as a bifunctional epoxy compound, disproportionated rosin (200 parts, trade name: PINE CRYSTAL KR614, manufactured by Arakawa Chemical industries, Ltd.) as a rosin component, and tetraethylammonium bromide (0.4 part, manufactured by Tokyo Chemical Industry Co., Ltd.) as a reaction catalyst are put into a stainless steel reaction vessel having a stirring apparatus, a heating apparatus, a cooling pipe, and a thermometer, the temperature is increased to 130° C., and a ring-opening reaction between the acidic group in the rosin and the epoxy group in the epoxy compound is caused. The reaction continues at the same temperature over 4 hours, and the reaction is stopped at a point in time when the acid value becomes 0.5 mg KOH/g, thereby obtaining ethylene glycol rosin.

Hexanediol Rosin (HD-R, Specific Rosin Diol B)

Hexanediol diglycidyl ether (76 parts, trade name: EX-212, manufactured by Nagase ChemteX Corporation) as a bifunctional epoxy compound, purified rosin which has undergone a purification treatment (200 parts) as a rosin component, and tetraethylammonium bromide (0.4 part, manufactured by Tokyo Chemical Industry Co., Ltd.) as a reaction catalyst are put into a stainless steel reaction vessel having a stirring apparatus, a heating apparatus, a cooling pipe, and a thermometer, the temperature is increased to 130° C., and a ring-opening reaction between the acidic group in the rosin and the epoxy group in the epoxy compound is caused. The reaction continues at the same temperature over 4 hours, and the reaction is stopped at a point in time when the acid value becomes 0.5 mg KOH/g, thereby obtaining hexanediol rosin.

Polyester Resin

Polyester Resin 1

| | |
|---|---|
| Hydrogenated bisphenol A rosin (HBPA-R) | 477 parts by weight |
| Terephthalic acid (manufactured by Waco Pure Chemical Industries, Ltd.) | 25 parts by weight |
| Dodecenyl succinic acid (manufactured by Tokyo Chemical Industry Co., Ltd.) | 90 parts by weight |

The above components and tetra-n-butyltitanate (0.3 part by weight, manufactured by Tokyo Chemical Industry Co., Ltd.) which is used as a reaction catalyst are put into a stainless steel reaction vessel having a stirring apparatus, a heating apparatus, a thermometer, a fractional distillation apparatus, and a nitrogen gas introduction pipe, a polycondensation reaction is caused at 230° C. for 7 hours while the solution is stirred under a nitrogen atmosphere, a fact that molecular weight and acid value reach predetermined values is confirmed, and a polyester resin 1 is synthesized.

The synthesized polyester resin 1 (2 g) is heated at 150° C. for 3 hours in heavy dimethyl sulfoxide (10 ml) and a heavy methanol solution (7N, 2 ml) of sodium hydroxide so as to be hydrolyzed. After that, heavy water is added, $^1$H-NMR measurement is carried out, and it is confirmed that a resin is composed of HBPA-R, terephthalic acid, and dodecenyl succinic acid in prepared values.

Polyester Resins 2 to 11

Polyester resins 2 to 11 are manufactured in the same manner as for the polyester resin 1 except that the kinds and composition amounts of the alcohol component and the carboxylic acid component are changed in accordance with Table 1.

Toner Particles

Manufacturing of Resin Particle Dispersion Liquid

Resin Particle Dispersion Liquid 1

A polyester resin 1 (100 parts by weight) is injected into a reactor having a stirring machine, dissolved and mixed at 120° C. for 30 minutes, then, an aqueous solution for neutralization having sodium dodecyl benzene sulfonic acid (1.0 part by weight) and a 1 N NaOH aqueous solution (1.0 part by weight) dissolved in ion exchange water (800 parts by weight) heated to 95° C. is injected into a flask, the solution is emulsified for 5 minutes using a homogenizer (manufactured by IKA, ULTRA-TURRAX), then, furthermore, vibrated for 10 minutes in an ultrasonic bath, and then the flask is cooled using room temperature water (25° C.). Thereby, a resin particle dispersion liquid 1 having a median diameter of the resin particles of 250 nm and a solid content amount of 20% by weight is obtained.

Manufacturing of Resin Particle Dispersion Liquids 2 to 11

Resin particle dispersion liquids 2 to 11 are manufactured in the same manner as for the resin particle dispersion liquid 1 except that the polyester resins 2 to 11 are used respectively instead of the polyester resin 1.

Manufacturing of Colorant Particle Dispersion Liquid 1

| | |
|---|---|
| Cyan pigment (manufactured by Dainichiseika Color & Chemicals Mfg. Co., Ltd., copper phthalocyanine, C.I. Pigment Blue 15:3): | 50 parts by weight |
| Anionic surfactant (manufactured by Dai-ichi Kogyo Seiyaku Co., Ltd., NEOGEN R): | 5 parts by weight |
| Ion exchange water: | 200 parts by weight |

The above components are mixed, dissolved, and dispersed using a homogenizer (manufactured by IKA, ULTRA-TURRAX) for 5 minutes and an ultrasonic bath for 10 minutes, thereby obtaining a cyan colorant particle dispersion liquid 1 having a central diameter of 190 nm and a solid content amount of 21.5%.

Manufacturing of Release Agent Particle Dispersion Liquid 1

| | |
|---|---|
| Anionic surfactant (manufactured by Dai-ichi Kogyo Seiyaku Co., Ltd., NEOGEN R): | 2 parts by weight |
| Ion exchange water: | 800 parts by weight |
| Paraffin wax (HNP-9, manufactured by Nippon Seiro Co., Ltd.): | 200 parts by weight |

The above components are mixed, heated to 120° C., and dispersed using a pressure discharge-type Gaulin homogenizer, thereby obtaining 20% by weight of a release agent dispersion liquid having a volume average particle diameter of 170 nm.

Manufacturing of Toner Particles 1

Resin particle dispersion liquid 1: 315 parts by weight (resin 63 parts by weight)

Colorant particle dispersion liquid 1:

40 parts by weight (pigment 8.6 parts by weight)

Release agent particle dispersion liquid 1:

40 parts by weight (release agent 8.0 parts by weight)

| | |
|---|---|
| Polyaluminum chloride: | 0.15 part by weight |
| Ion exchange water: | 300 parts by weight |

The components are mixed and dispersed in a round stainless steel flask using a homogenizer (manufactured by IKA, ULTRA-TURRAX T50) according to the above blending, then, the flask is heated to 42° C. while being stirred in a heating oil bath, the temperature is maintained at 42° C. for 60 minutes, then, the resin particle dispersion liquid 1 (105 parts by weight/21 parts by weight of the resin) is added and the resultant is stirred. After that, the pH in the system is adjusted to 6.0 using 0.5 mol/liter of an aqueous solution of sodium hydroxide, and then the resin particle dispersion liquid is heated to 95° C. while being continuously stirred. During the temperature rise to 95° C., generally, the pH in the system decreases to 5.0 or less; however, here, an aqueous solution of sodium hydroxide is added dropwise so as to prevent the pH from decreasing to 5.5 or less.

After the end of the reaction, the resin particle dispersion liquid is cooled, filtered, and washed using ion exchange water, then solid and liquid are separated through Nutsche-type suction filtration. In addition, the resin particle dispersion liquid is re-dispersed in ion exchange water (3,000 parts) at 40° C., stirred and washed at 300 rpm for 15 minutes. The washing operation is repeated 5 times, solid and liquid are separated through Nutsche-type suction filtration, and, subsequently, vacuum drying is carried out for 12 hours, thereby obtaining toner particles 1.

Manufacturing of Toner Particles 2 to 11

Toner particles 2 to 11 are manufactured respectively in the same manner as for the toner particles 1 except that the resin dispersion liquids 2 to 11 are used respectively instead of the resin dispersion liquid 1.

Example 1

Manufacturing of Toner and Developer

Hydrophobic silica (1.5 parts, manufactured by Cabot Corporation, TS720) is added to the obtained toner particles 1 (50 parts) and mixed using a sample mill, thereby obtaining a toner 1.

In addition, a ferrite carrier which is coated with 1% of polymethyl methacrylate (manufactured by Soken Chemical & Engineering Co., Ltd., Mw 75,000), and has an average particle diameter of 50 μm is used, each of the obtained externally added toner is weighed so that the concentration of the toner becomes 5%, and the carrier and the toner are stirred and mixed for 5 minutes using a ball mill, thereby manufacturing a developer.

Evaluation

Glass Transition Temperature and Softening Point

The glass transition temperature and softening point of the polyester resin 1 synthesized in the above manner are measured using the above method.

Low-temperature Fixing Properties

The low-temperature fixing properties of the manufactured toner 1 are evaluated by obtaining the lowest fixing temperature in the following manner.

A 40 mm×50 mm solid image is prepared as an image, the amount of the toner is set to 1.5 mg/cm², mirror coated platinum paper (weight: 127 gsm) is used as recording paper, and evaluation is carried out. Next, a DocuPrint C2220 fixing machine is modified so as to make fixing temperature changeable, and fixing properties are evaluated while increasing the fixing temperature in a step-like manner from 100° C.

Next, regarding the low-temperature fixing properties, a favorable fixed image without image defects caused by poor release is folded using the weight of predetermined load, and the degree of image defects at the folded portions are graded, and the indexes of the low-temperature fixing properties are determined using a fixing temperature at which a certain grade or better is obtained as the lowest fixing temperature.

The evaluation standards are as follows.

A: 140° C. or lower

B: higher than 140° C. to 150° C.

C: higher than 150° C. to 160° C.

D: higher than 160° C.

Heat Storing Properties

Images are formed at an image density of 1% on 10000 sheets of color paper (J paper) manufactured by Fuji Xerox Co., Ltd. under an atmosphere of 28° C. and 85% RH using the manufactured developers and a DocuCentreColor400 manufactured by Fuji Xerox Co., Ltd. The fixing temperature is set to a temperature that is 30° C. higher than the lowest fixing temperature obtained above. The shapes of white lines generated at the solid portions on the images after the printing of 10000 sheets are visually observed, the toners in the developing machine are removed, and the shapes of the toners mutually attached (blocked) are visually observed. The heat storing properties are evaluated from the above observation using the following standards.

The evaluation standards are as follows.

A: No white line is generated, and the toners mutually attached in the developing machine are rarely observed B: No white line is generated, but the toners mutually attached in the developing machine are slightly observed C: White lines are slightly generated, and the toners mutually attached in the developing machine are partially observed D: White lines are evidently generated, and the toners mutually attached in the developing machine are observed Examples 2 To 9, and Comparative Examples 1 and 2

The glass transition temperatures and softening points of the polyester resins 2 to 11 are measured using the above method and evaluated in the same manner as for Example 1. The results are shown in Table 1.

In addition, developers are manufactured in the same manner as for Example 1 except that the toner particles are changed according to Table 2, and the low-temperature fixing properties and the heat storing properties are evaluated. The results are shown in Table 2.

TABLE 1

| | | Polyester resin 1 | Polyester resin 2 | Polyester resin 3 | Polyester resin 4 | Polyester resin 5 | Polyester resin 6 |
|---|---|---|---|---|---|---|---|
| Alcohol component | Aspect | I-1 | I-1 | II-1 | I-1 | II-1 | I-2 |
| | Kinds of alchol (content with respect to the total alcohol component) (Addition amount) | HBPA-R (100 mol %) (953 parts by weight) | CHDM-R (70 mol %) (604 parts by weight) | PD-R (30 mol %) (239 parts by weight) | CHDC-R (80 mol %) (713 parts by weight) | EG-R (10 mol %) (312.4 parts by weight) | HBPA-R (40 mol %) (381 parts by weight) |
| | | — | 1,3-propanediol (30 mol %) (23 parts by weight) | 1,4-cyclo hexane dimethanol (70 mol %) (101 parts by weight) | 1,6-hexanediol (20 mol %) (24 parts by weight) | 1,3-cyclopentanediol (90 mol %) (92 parts by weight) | HBPA (30 mol %) (72 parts by weight) |
| | | — | — | — | — | — | 1,3-propanediol (30 mol %) (23 parts by weight) |
| Carboxylic acid component (addition amount) | | Terephthalic acid (50 parts by weight) | Isophthalic acid (133 parts by weight) | Isophthalic acid (163 parts by weight) | Terephthalic acid (163 parts by weight) | Isophthalic acid (163 parts by weight) | Isophthalic acid (66 parts by weight) |
| | | Dodecenyl succinic acid (181 parts by weight) | Dodecenyl succinic acid (44 parts by weight) | — | — | — | Dodecenyl succinic acid (22 parts by weight) |
| Glass transition temperature Tg (° C.) | | 57 | 55 | 52 | 57 | 53 | 54 |
| Softening point Tm (° C.) | | 122 | 122 | 118 | 128 | 123 | 119 |
| Δ | | 65 | 67 | 66 | 71 | 70 | 65 |
| Weight-average molecular weight (Mw) | | 65000 | 73000 | 62000 | 80000 | 75000 | 68000 |

| | | Polyester resin 7 | Polyester resin 8 | Polyester resin 9 | Polyester resin 10 | Polyester resin 11 |
|---|---|---|---|---|---|---|
| Alcohol component | Aspect | I-2 | I-1 | II-1 | — | — |
| | Kinds of alchol (content with respect to the total alcohol component) (Addition amount) | CHDM-R (30 mol %) (259 parts by weight) | HBPA-R (60 mol %) (572 parts by weight) | HD-R (40 mol %) (335 parts by weight) | EG-R (90 mol %) (703 parts by weight) | PD-R (100 mol %) (795 parts by weight) |
| | | 1,4-cyclohexanedimethanol (30 mol %) (43 parts by weight) | 1,6-heaxanediol (40 mol %) (47 parts by weight) | HBPA (60 mol %) (144 parts by weight) | 1,3-propanediol (10 mol %) (23 parts by weight) | — |
| | | 1,6-haxanediol (40 mol %) (47 parts by weight) | — | — | — | — |
| Carboxylic acid component (addition amount) | | Terephthalic acid (66 parts by weight) | Isophthalic acid (163 parts by weight) | Terephthalic acid (163 parts by weight) | Isophthalic acid (163 parts by weight) | Terephthalic acid (163 parts by weight) |
| | | — | — | — | — | — |
| Glass transition temperature Tg (° C.) | | 55 | 51 | 53 | 50 | 54 |
| Softening point Tm (° C.) | | 127 | 124 | 126 | 129 | 132 |
| Δ | | 72 | 73 | 75 | 79 | 78 |
| Weight-average molecular weight (Mw) | | 59000 | 64000 | 70000 | 54000 | 69000 |

R . . . rosin,
HBPA . . . hydrogenated bisphenol A,
CHDM . . . 1,4-cyclohexanedimethanol,
PD . . . propanediol,
CHDC . . . 1,2-cyclohexanedicarboxylic acid,
EG . . . ethylene glycol,
CPDM . . . cyclopentanedimethanol,
HD . . . hexanediol

TABLE 2

| | Example 1 Polyester resin 1 Toner particles 1 | Example 2 Polyester resin 2 Toner particles 2 | Example 3 Polyester resin 3 Toner particles 3 | Example 4 Polyester resin 4 Toner particles 4 | Example 5 Polyester resin 5 Toner particles 5 | Example 6 Polyester resin 6 Toner particles 6 | Example 7 Polyester resin 7 Toner particles 7 | Example 8 Polyester resin 8 Toner particles 8 | Example 9 Polyester resin 9 Toner particles 9 | Comparative example 1 Polyester resin 10 Toner particles 10 | Comparative example 2 Polyester resin 11 Toner particles 11 |
|---|---|---|---|---|---|---|---|---|---|---|---|
| Lowest fixing temperature | B | B | A | B | B | A | C | B | C | C | D |
| Heat storing properties | A | B | C | B | C | B | B | C | C | D | C |

From the above results, it is evident that the differences between the glass transition temperature and the softening point are reduced in the polyester resins for a toner of the examples compared to the polyester resins for a toner of the comparative examples.

In addition, it is evident that the examples show favorable results regarding the low-temperature fixing properties and the heat storing properties compared to the comparative examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A polyester resin for a toner which is a polycondensate of a carboxylic acid component and an alcohol component including rosin diol that is represented by the following formula (1) and has an alicyclic structure (alicyclic alcohol),

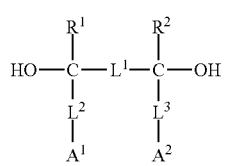

(1)

wherein in the formula (1),
R$^1$ and R$^2$ each independently represents hydrogen or a methyl group,
L$^1$ represents a divalent linking group having an alicyclic structure,
L$^2$ and L$^3$ each independently represents a divalent linking group selected from a group consisting of a carbonyl group, a carboxyl group, an ether group, a sulfonyl group, a chain-like alkylene group which may have a substituent, a cyclic alkylene group, a phenylene group, and combinations thereof, and
A$^1$ and A$^2$ represent a rosin ester group,
provided that the divalent linking group having the alicyclic structure represented by L$^1$ may be a divalent linking group having an alicyclic structure formed through linking with any of R$^1$, R$^2$, L$^2$ or L$^3$.

2. The polyester resin for a toner according to claim 1, wherein the alcohol component includes rosin diol that is represented by the formula (1) and has an alicyclic structure and an alcohol having an alicyclic structure except the rosin diol.

3. A polyester resin for a toner which is a polycondensate of a carboxylic acid component and an alcohol component including rosin diol that is represented by the following formula (2) and an alcohol having an alicyclic structure,

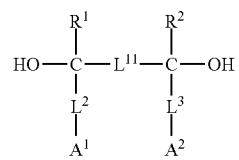

(2)

wherein in the formula (2),
R$^1$ and R$^2$ each independently represents hydrogen or a methyl group,
L$^{11}$ represents a divalent linking group selected from a group consisting of a carbonyl group, a carboxyl group, an ether group, a sulfonyl group, a chain-like alkylene group which may have a substituent, a phenylene group, and combinations thereof,
L$^2$ and L$^3$ each independently represents a divalent linking group selected from a group consisting of a carbonyl group, a carboxyl group, an ether group, a sulfonyl group, a chain-like alkylene group which may have a substituent, a cyclic alkylene group, a phenylene group, and combinations thereof, and
A$^1$ and A$^2$ represent a rosin ester group.

4. The polyester resin for a toner according to claim 1, wherein a content of the rosin diol having an alicyclic structure is from 70% by weight to 100% by weight with respect to the entire alcohol component.

5. The polyester resin for a toner according to claim 2, wherein a total content of the rosin diol having an alicyclic structure and the alcohol having an alicyclic structure is from 70% by weight to 100% by weight with respect to the entire alcohol component, and a content of the alcohol having an alicyclic structure is 90% by weight or less with respect to the entire alcohol component.

6. The polyester resin for a toner according to claim 3, wherein the content of the alcohol having an alicyclic structure is from 70% by weight to 90% by weight with respect to the entire alcohol component.

7. The polyester resin for a toner according to claim 1, wherein the alicyclic structure is a six-membered ring structure.

8. The polyester resin for a toner according to claim 3, wherein the alicyclic structure is a six-membered ring structure.

9. The polyester resin for a toner according to claim 1, wherein the alicyclic structure is a six-membered ring structure having a six-membered ring linked at a symmetric location.

10. The polyester resin for a toner according to claim 3, wherein the alicyclic structure is a six-membered ring structure having a six-membered ring linked at a symmetric location.

11. An electrostatic charge image developing toner comprising: the polyester resin for a toner according to claim 1.

12. An electrostatic charge image developing toner comprising: the polyester resin for a toner according to claim 3.

13. An electrostatic charge image developer comprising: the electrostatic charge image developing toner according to claim 11.

14. An electrostatic charge image developer comprising: the electrostatic charge image developing toner according to claim 12.

15. A toner cartridge which contains the electrostatic charge image developing toner according to claim 11, and is detachable from an image forming apparatus.

16. A toner cartridge which contains the electrostatic charge image developing toner according to claim 12, and is detachable from an image forming apparatus.

17. A process cartridge comprising a developing unit that contains the electrostatic charge image developer according to claim 13, and develops an electrostatic charge image formed on a surface of an image holding member using the electrostatic charge image developer so as to form a toner image, which is detachable from an image forming apparatus.

18. A process cartridge comprising: a developing unit that contains the electrostatic charge image developer according to claim 14, and develops an electrostatic charge image formed on a surface of an image holding member using the electrostatic charge image developer so as to form a toner image, which is detachable from an image forming apparatus.

19. An image forming apparatus comprising:
an image holding member;
a charging unit that charges a surface of the image holding member;
an electrostatic charge image forming unit that forms an electrostatic charge image on the surface of the image holding member;
a developing unit that contains the electrostatic charge image developer according to claim 13, and develops the electrostatic charge image using the electrostatic charge image developer so as to form a toner image;
a transferring unit that transfers the toner image to a recording medium; and
a fixing unit that fixes the toner image to the recording medium.

20. An image forming apparatus, comprising:
an image holding member;
a charging unit that charges a surface of the image holding member;
an electrostatic charge image forming unit that forms an electrostatic charge image on the surface of the image holding member;
a developing unit that contains the electrostatic charge image developer according to claim 14, and develops the electrostatic charge image using the electrostatic charge image developer so as to form a toner image;
a transferring unit that transfers the toner image to a recording medium; and
a fixing unit that fixes the toner image to the recording medium.

21. An image forming method comprising:
charging a surface of an image holding member;
forming an electrostatic charge image on the surface of the image holding member;
developing the electrostatic charge image using the electrostatic charge image developer according to claim 13 so as to form a toner image;
transferring the toner image to a recording medium; and
fixing the toner image to the recording medium.

22. An image forming method comprising:
charging a surface of an image holding member;
forming an electrostatic charge image on the surface of the image holding member;
developing the electrostatic charge image using the electrostatic charge image developer according to claim 14 so as to form a toner image;
transferring the toner image to a recording medium; and
fixing the toner image to the recording medium.

* * * * *